US012521736B2

(12) United States Patent
Healy

(10) Patent No.: US 12,521,736 B2
(45) Date of Patent: Jan. 13, 2026

(54) SERVICEABLE SPRINKLER WITH NUTATING DISTRIBUTION PLATE AND WEAR SLEEVE

(71) Applicant: Hunter Agriculture Incorporated, San Marcos, CA (US)

(72) Inventor: Mark Healy, Orlando, FL (US)

(73) Assignee: Hunter Agriculture Incorporated, San Marcos, CA (US)

(*) Notice: Subject to any disclaimer, the term of this patent is extended or adjusted under 35 U.S.C. 154(b) by 0 days.

(21) Appl. No.: 18/540,399

(22) Filed: Dec. 14, 2023

(65) Prior Publication Data

US 2024/0109083 A1 Apr. 4, 2024

Related U.S. Application Data

(63) Continuation of application No. 17/142,070, filed on Jan. 5, 2021, now Pat. No. 11,865,564.

(60) Provisional application No. 63/009,892, filed on Apr. 14, 2020, provisional application No. 62/962,700, filed on Jan. 17, 2020.

(51) Int. Cl.
*B05B 3/00* (2006.01)
*B05B 15/18* (2018.01)

(52) U.S. Cl.
CPC .............. *B05B 3/008* (2013.01); *B05B 15/18* (2018.02)

(58) Field of Classification Search
CPC ....... B05B 3/008; B05B 15/18; B05B 3/0486; B05B 1/16; B05B 1/265; B05B 15/65
See application file for complete search history.

(56) References Cited

U.S. PATENT DOCUMENTS

| | | | |
|---|---|---|---|
| 2,848,276 | A | 8/1958 | Clearman |
| 3,009,648 | A | 11/1961 | Hait |
| 3,034,728 | A | 5/1962 | Druby |
| 3,091,400 | A | 5/1963 | Claude |
| 3,312,400 | A | 4/1967 | Clearman |
| 3,682,388 | A | 8/1972 | Ferguson |
| 3,799,453 | A | 3/1974 | Hart |
| 4,356,972 | A | 11/1982 | Vikre |
| 4,398,666 | A | 8/1983 | Hunter |
| 4,487,368 | A | 12/1984 | Clearman |
| 4,773,594 | A | 9/1988 | Clearman |
| 4,796,811 | A | 1/1989 | Davisson |
| RE33,823 | E | 2/1992 | Nelson et al. |
| 5,234,169 | A | 8/1993 | McKenzie |
| 5,372,307 | A | 12/1994 | Sesser |
| 5,381,960 | A | 1/1995 | Sullivan et al. |
| 5,439,174 | A | 8/1995 | Sweet |
| 5,671,886 | A | 9/1997 | Sesser |
| 5,699,962 | A | 12/1997 | Scott et al. |

(Continued)

*Primary Examiner* — Steven M Cernoch
(74) *Attorney, Agent, or Firm* — KNOBBE, MARTENS, OLSON & BEAR, LLP

(57) ABSTRACT

A sprinkler assembly with a nutating distribution plate can improve even distribution of water. The distribution plate can tilt and/or translate upon water impinging the distribution plate to disperse water in different directions. The sprinkler assembly can have a deflector assembly including the distribution plate, a spindle supported by a bearing, and a contact portion downstream of the distribution plate to contact a housing that limits a range of movement of the distribution plate. The sprinkler assembly can be disassembled and reassembled with minimal tools and effort for servicing.

21 Claims, 17 Drawing Sheets

(56) References Cited

U.S. PATENT DOCUMENTS

| | | | |
|---|---|---|---|
| 5,950,927 A | 9/1999 | Elliott et al. | |
| 6,176,440 B1 | 1/2001 | Elliott | |
| 6,186,414 B1 | 2/2001 | Clearman et al. | |
| 6,199,771 B1 | 3/2001 | Clearman et al. | |
| 6,341,711 B1 | 1/2002 | Blake | |
| 6,382,525 B1 | 5/2002 | Santiesteban et al. | |
| 6,439,477 B1 | 8/2002 | Sweet et al. | |
| 6,494,384 B1 * | 12/2002 | Meyer | B05B 3/16<br>239/233 |
| 6,530,532 B1 | 3/2003 | Santiesteban et al. | |
| 6,676,038 B2 | 1/2004 | Gressett et al. | |
| 6,871,795 B2 | 3/2005 | Anuskiewicz | |
| 6,932,279 B2 | 8/2005 | Burcham | |
| 7,037,960 B2 | 5/2006 | Ukai | |
| 7,070,122 B2 | 7/2006 | Burcham et al. | |
| 7,287,710 B1 | 10/2007 | Nelson et al. | |
| 7,395,977 B2 | 7/2008 | Pinch et al. | |
| 7,562,833 B2 | 7/2009 | Perkins et al. | |
| 7,770,821 B2 | 8/2010 | Pinch | |
| 7,942,345 B2 | 5/2011 | Sesser et al. | |
| 8,556,196 B2 | 10/2013 | Lawyer et al. | |
| 8,584,969 B2 | 11/2013 | Drechsel | |
| 8,991,724 B2 | 3/2015 | Sesser et al. | |
| 10,710,103 B2 | 7/2020 | Lawyer et al. | |
| 10,828,653 B2 | 11/2020 | Healy | |
| 2011/0155827 A1 | 6/2011 | Drechsel | |
| 2013/0327846 A1 | 12/2013 | Sesser et al. | |
| 2018/0311684 A1 | 11/2018 | Lawyer et al. | |
| 2019/0054480 A1 | 2/2019 | Sesser et al. | |
| 2020/0047195 A1 | 2/2020 | Healy | |
| 2020/0290060 A1 | 9/2020 | Lawyer et al. | |

* cited by examiner

SERVICEABLE SPRINKLER WITH NUTATING DISTRIBUTION PLATE AND WEAR SLEEVE

CROSS-REFERENCE TO RELATED APPLICATION

This application is a continuation application of U.S. patent application Ser. No. 17/142,070, filed Jan. 5, 2021, and entitled "SERVICEABLE SPRINKLER WITH NUTATING DISTRIBUTION PLATE AND WEAR SLEEVE," which claims benefit under 35 U.S.C. 119(e) to U.S. Provisional Patent App. Nos. 62/962,700, filed Jan. 17, 2020, and 63/009,892, filed Apr. 14, 2020, the entire disclosures of which are hereby incorporated by reference herein in their entireties. Any and all priority claims identified in the Application Data Sheet, or any corrections thereto, are hereby incorporated by reference under 37 CFR 1.57.

TECHNICAL FIELD

The present disclosure relates to apparatuses for irrigating turf, agriculture, and/or landscaping.

BACKGROUND

In many parts of the world, rainfall can be insufficient and/or too irregular to keep turf and landscaping green and/or to sufficiently water crops and other agricultural products. Therefore, irrigation systems are often installed to provide adequate irrigation to landscaping and/or agricultural products.

SUMMARY

In certain irrigation applications, it can be advantageous to utilize sprinklers with a nutating distribution plate. For example, sprinklers with a nutating distribution plate can utilize fewer parts than a gear driven sprinkler. Sprinklers with a nutating distribution plate can also be capable of operating using relatively large unobstructed water flow paths for overhead irrigation of large fields and crops. Utilizing larger water flow paths can reduce the need to finely filter or otherwise purify water used for irrigation. In some such cases, water from rivers, streams, lakes, ponds, wells, and/or other water sources can be used with less purification infrastructure than may be necessary for gear driven sprinklers.

However, sprinkler components, such as a nutating distribution plate and components associated with the plate, can be worn due to the nutating movements and need to be replaced. Using less purified water can also result in debris accumulating in the sprinkler components. Servicing the sprinklers to repair or replace components, and/or to clean the components, can be expensive, inconvenient, time consuming, and/or difficult. It can be desirable for sprinklers to be easily serviceable with minimal tools and effort. For example, it would be desirable to be able to service sprinklers with a nutating distributing plate in the field.

A nutating distribution plate needs to begin to rock and rotate soon after the water is applied. Often the water is applied at very low pressures, such as 10 PSI. It is desirable for the distribution plate to start moving at very low pressures and low flow by providing a very low amount of resistance to movement.

In some embodiments, a sprinkler assembly can comprise an inlet configured to receive water, a bracket supported by the inlet, and a nozzle in fluid communication with the inlet and positioned downstream of the inlet. The nozzle is configured to direct the water out of the nozzle along an axis. The sprinkler assembly can further comprise a bearing positioned downstream of the nozzle and supported by the bracket, and a deflector assembly disposed between the nozzle and the bearing and supported by the bearing at least when the sprinkler assembly is not pressurized. The deflector assembly is configured to move with respect to the axis in one or both of a rotational and a tilting direction. The deflector assembly can comprise a distribution plate positioned downstream of the nozzle and configured to deflect water from the nozzle and a wear sleeve positioned downstream of the distribution plate. The sprinkler assembly can further comprise a housing supported by the bracket and at least partially surrounding the wear sleeve. The housing has one or more surfaces configured to contact the wear sleeve so as to limit movement of the deflector assembly in one or both of the rotational and the tilting direction about the housing when the sprinkler assembly is pressurized.

In some embodiments, a sprinkler assembly can comprise an inlet, a bracket connected to the inlet, and a nozzle in fluid communication with the inlet and positioned downstream of the inlet. The nozzle is configured to direct water out of the nozzle along a nozzle axis. The sprinkler assembly further comprising a deflector assembly downstream of the nozzle and configured to move with respect to the nozzle axis in one or both of a rotational and a tilting direction about a pivot point. The deflector assembly comprises a distribution plate configured to deflect water from the nozzle and a spindle extending from a side of the distribution plate facing away from the nozzle and terminating at a distal end. The distal end comprises a receptacle. The deflector assembly further comprises a wear sleeve carried by the spindle. The sprinkler assembly further comprises a bearing supported by the bracket and contacting the receptacle at least when the sprinkler assembly is at rest to bear substantially all of a weight of the deflector assembly. The bearing defines the pivot point. The sprinkler assembly further comprises a housing supported by the bracket and comprising a surface configured to contact the wear sleeve to limit movement of the deflector assembly in at least one or both of the rotational and the tilting direction about the pivot point, the housing defining the pivot point when the sprinkler assembly is in operation.

In some embodiments, a method of providing irrigation using a sprinkler assembly so that water is dispersed in different directions, the method comprises receiving water at a predetermined pressure at an inlet of the sprinkler assembly and directing water from the inlet through a nozzle positioned downstream of and in fluid communication with the inlet. The water exiting the nozzle along a nozzle axis and impinging a distribution plate of a deflector assembly of the sprinkler assembly. The distribution plate is positioned downstream of the nozzle and at a first angular position relative to the nozzle axis and a pivot point. The method further includes dispersing water out of the sprinkler assembly in a first direction through one or more curved grooves on a side of the distribution plate facing the nozzle, impinging water on the distribution plate to rotate or translate the distribution plate to a second angular position relative to the nozzle axis and the pivot point, and contacting a contact portion of the deflector assembly with an inner surface of a housing of the sprinkler assembly when the distribution plate rotates or translates to operably limit ranges of movements of the distribution plate. The pivot point, the inner surface, and the contact portion are positioned downstream of the distribution plate. The method further comprises dispersing water out of the sprinkler assembly in a second direction through the one or more curved grooves of the distribution plate at the second angular position.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

FIG. 15 further shows a spindle of the deflector assembly. The spindle supports the one or more weights and comprises the one or more notches.

DETAILED DESCRIPTION

Figure 1:
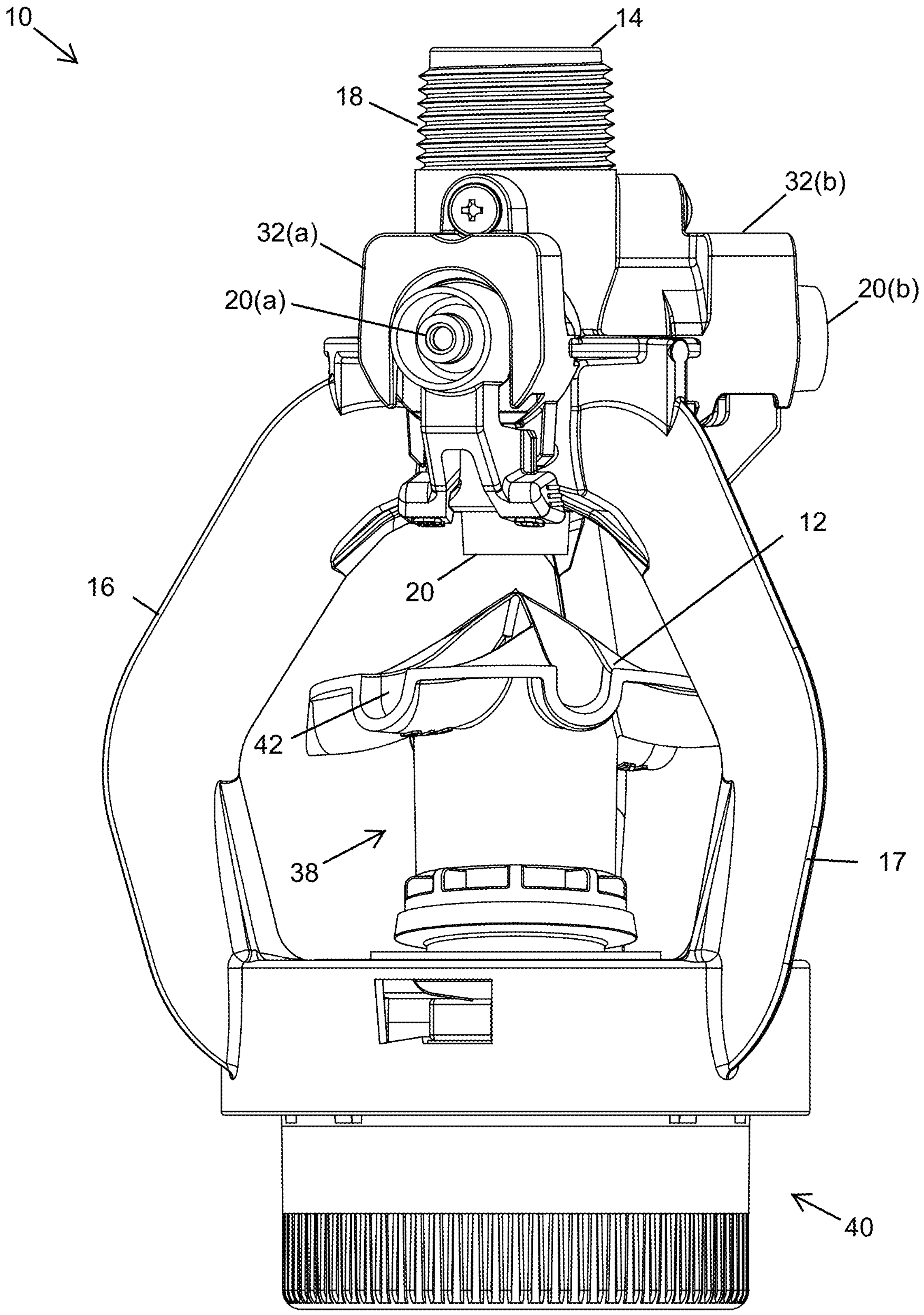
FIG. 1 is a front plan view of an embodiment of a sprinkler with a distribution plate which nutates in a counter clockwise direction during operation of the sprinkler.
Figure 12:
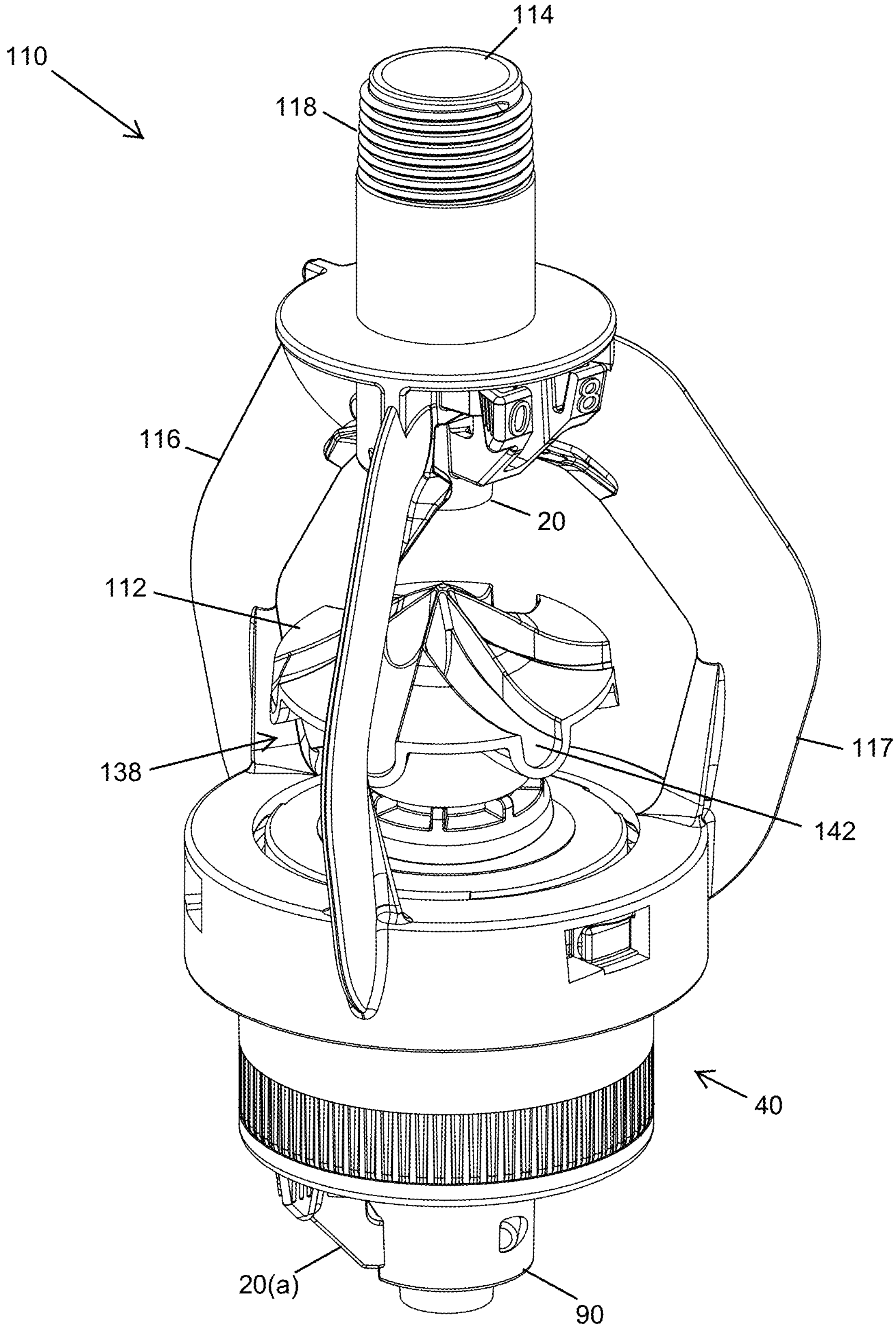
FIG. 12 is a top perspective view of an embodiment of a sprinkler that is similar to the sprinkler illustrated in FIG. 3 except the distribution plate illustrated in FIG. 3 has been replaced with the distribution plate illustrated in FIG. 8, the location and configuration of the one or more nozzle carriers illustrated in FIG. 3 has been changed to a location on an opposite side of the distribution plate from the inlet, and the deflector assembly comprises one or more weights and one or more notches.

FIG. 1 is a front plan view of an embodiment of a sprinkler 10 with a distribution plate 12 configured to nutate in a counter clockwise direction during operation of the sprinkler 10. An embodiment of a sprinkler 110 that includes a distribution plate 112 configured to nutate in a clockwise direction is illustrated in FIG. 12. A radial angle of one or more grooves 42, 142 in the distribution plate 12, 112 causes the distribution plate 12, 112 to rotate in the clockwise direction or the counter clockwise direction.

As explained below, the distribution plate 12, 112 is coupled to the sprinkler 10, 110 so as exhibit a desired nodding or swaying motion about an axis of rotation during operation of the sprinkler 10, 110.

The sprinkler 10 can include an inlet 14. The inlet 14 defines an upstream end of the sprinkler 10. The inlet 14 can be configured to connect to a water source (e.g., an arm of an irrigation system, a water line, a hose, or some other source of water). In certain embodiments, the inlet 14 supports a frame or bracket 16. In some embodiments, the inlet 14 can be formed as a part of the bracket 16. In some embodiments, the inlet 14 can be a separate piece that is removably or permanently attached to the bracket 16.

In some embodiments, the inlet 14 is configured to be secured to a water supply line on an irrigation system. In some embodiments, the inlet 14 is at least partially surrounded by threads 18. The threads 18 can be screwed into the water supply line on the irrigation system. In some instances, a pressure regulator can be positioned between the water supply line and the sprinkler 10. The inlet 14 can also be screwed into an outlet of the pressure regulator. Other attachment methods, including, but not limited to, glued connections, bayonet mounts, snap rings, keys, or collars can be used to secure the sprinkler 10 to either a water supply line or a pressure regulator.

Figure 2:
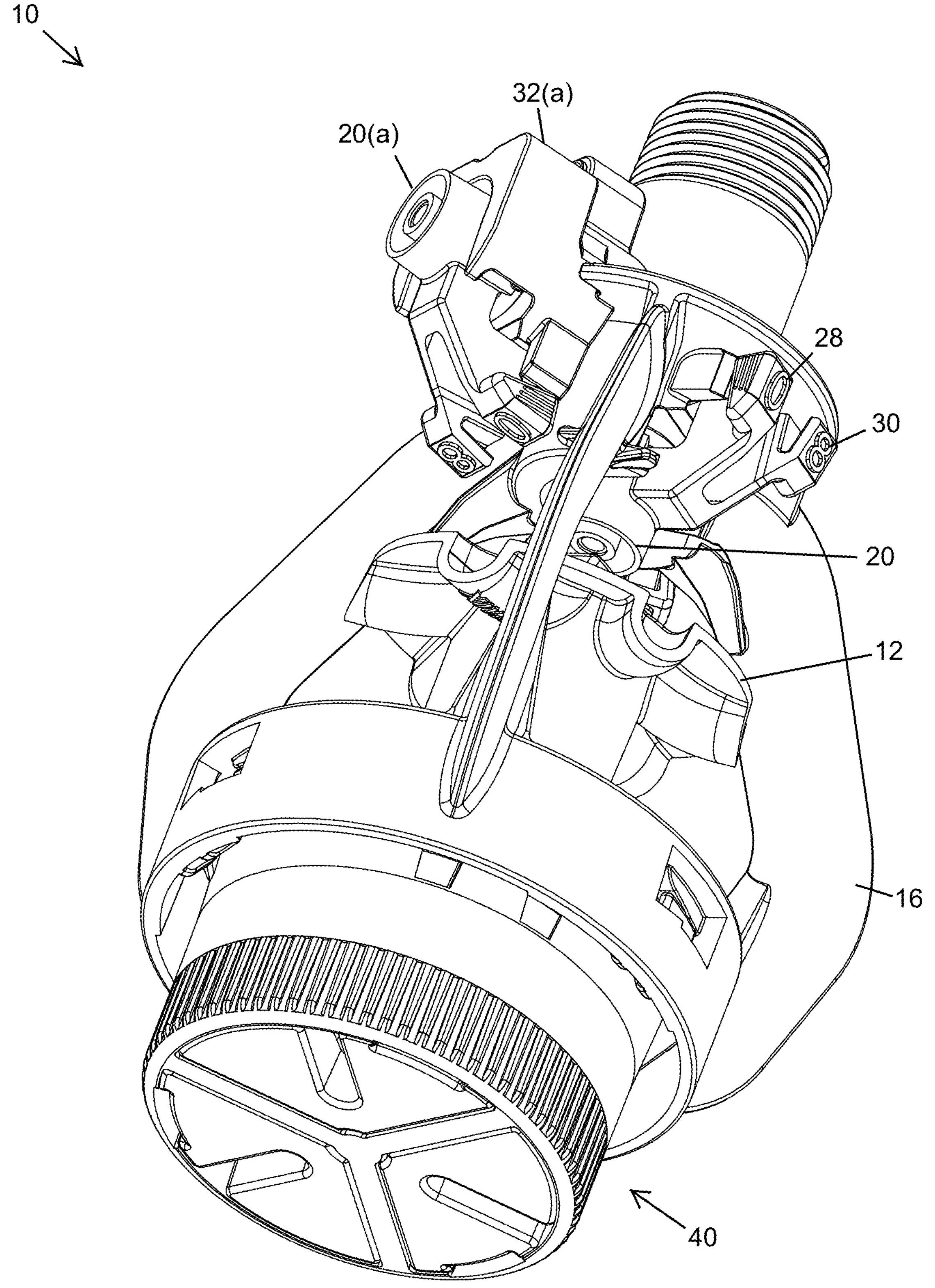
FIG. 2 is a bottom perspective view of the sprinkler of FIG. 1 showing the distribution plate located downstream of a nozzle coupled to an inlet.

FIG. 2 is a bottom perspective view of the sprinkler 10 of FIG. 1. The sprinkler 10 can include a nozzle 20. The nozzle 20 can be in fluid communication with the inlet 14. The nozzle 20 can extend at least partially beyond a downstream end of the inlet 14. The nozzle 20 can be configured to output water that enters the nozzle 20 from the inlet 14. In some embodiments, the nozzle 20 can output water in a pressurized manner. For example, the nozzle 20 can direct pressurized water received from the inlet 14.

In some embodiments, the nozzle 20 can output water in a predetermined direction. For example, the nozzle 20 can output water along a longitudinal axis 46 of the nozzle 20 (see FIG. 5). In some embodiments, the nozzle 20 can direct water towards a predetermined location within the sprinkler 10. In some embodiments, the nozzle 20 can direct water in a direction towards a component of the sprinkler 10. In certain embodiments, the position of the component may be fixed, user adjustable, or movable with respect to the nozzle 20. For example, the nozzle 20 can direct water in a direction towards the distribution plate 12.

As mentioned above, in certain embodiments, the inlet 14 supports the bracket 16. For example, in some embodiments, the bracket 16 is directly coupled to the inlet 14. In some embodiment, the bracket 16 is indirectly coupled to the inlet 14 via another component of the sprinkler 10. For example, in some embodiments, the bracket 16 is coupled to a spacer component or one or more nozzle carriers 32(*a*), 32(*b*).

In the illustrated embodiments, the bracket 16 is manufactured as an integral component with the inlet 14. In alternate embodiments, the bracket 16 is manufactured as a separate component from the inlet 14 and subsequently coupled to the inlet 14 during assembly.

The bracket 16 is configured to generally support the distribution plate 12 relative to the inlet 14 and/or the nozzle 20 while allowing the distribution plate 12 to nutate during operation of the sprinkler 10. In the illustrated embodiment, the bracket 16 is sized and shaped to allow the distribution plate 12 to nutate during operation of the sprinkler 10 while preventing the distribution plate 12 from separating from the sprinkler 10. In this way, the bracket 16 prevents the distribution plate 12 from breaking free from the inlet 14 due to the force created by the pressurized water exiting the nozzle 20 impinging on the distribution plate 12.

The bracket 16 can directly or indirectly couple to the distribution plate 12. In the illustrated embodiment, the bracket 16 couples the inlet 14 to the distribution plate 12 via a housing 40. In other embodiments, the bracket 16 directly couples to the distribution plate 12 while allowing the distribution plate 12 to nutate during operation of the sprinkler 10. For example, the bracket 16 can couple to the distribution plate 12 via a joint such as a ball joint or ball-and-socket joint.

The bracket 16 can include one or more arms 17 (for example, one, two, three, four, or more). In embodiments which include a plurality of arms 17, the arms 17 can be spaced apart from one another. As most clearly illustrated in FIG. 4, the illustrated bracket 16 has three arms 17. In some embodiments, one or more of the arms 17 can have an outwardly bulging middle section. The outwardly bulging middle section can be sized and shaped to accommodate movement of the distribution plate 12. The one or more arms 17 can be joined at one or both of their upstream and downstream ends with a collar. In some embodiments, the upstream end of the bracket 16 is closer to the inlet 14 than the downstream end.

Figure 3:
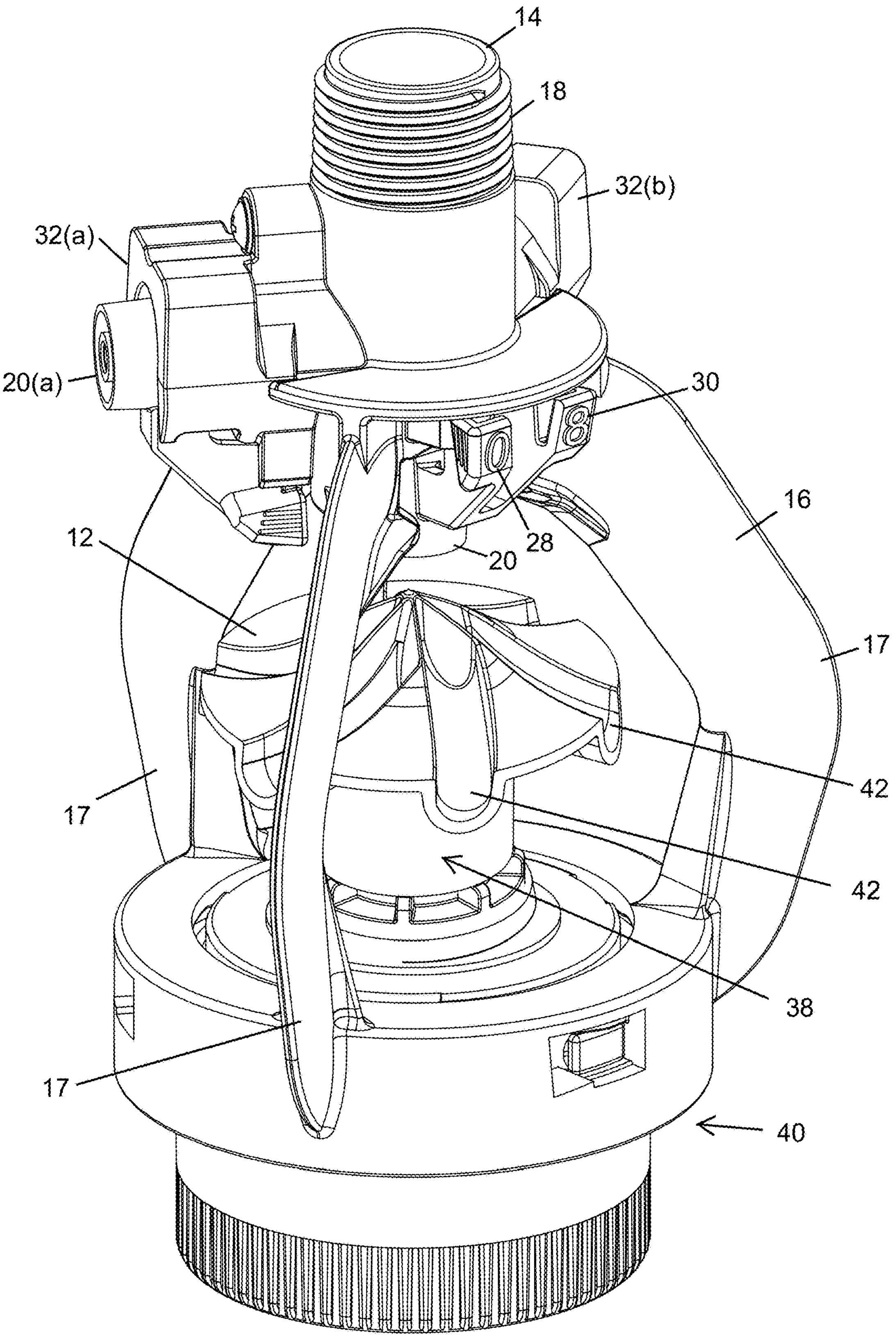
FIG. 3 is a top perspective view of the sprinkler of FIG. 1 showing one or more grooves on an upstream side of the distribution plate.

FIG. 3 is a top perspective view of the sprinkler 10 of FIG. 1 showing one or more grooves 42 on an upstream side of the distribution plate 12. The distribution plate 12 can be positioned downstream of the nozzle 20. In some embodiments, the nozzle 20 is configured to direct water onto the distribution plate 12.

Water impingement on the distribution plate 12 can cause the distribution plate 12 to "wobble." For example, the distribution plate 12 can be configured to rotate and/or tilt with respect to the longitudinal axis 46 of the nozzle 20 or some other axis thereof, and/or undergo nutation in reaction to water impingement from the nozzle 20 onto the distribution plate 12. In the illustrated embodiment, the water impingement from the nozzle 20 contacts the one or more grooves 42 on the upstream side of the distribution plate 12 imparting lateral forces on the distribution plate 12. Wobbling of the distribution plate 12 can allow water to be dispersed in different directions. Dispersing water in different directions can facilitate a more even distribution of water about an area of irrigation than a sprinkler without the distribution plate 12 which nutates.

In the illustrated embodiment, the distribution plate 12 forms a component of a deflector assembly 38 which will be further described below. In some embodiments, the deflector assembly 38 is supported by the housing 40 so as to allow the deflector assembly 38, which carries the distribution plate 12, to "wobble" in concert with the distribution plate 12. The deflector assembly 38 can be surrounded by the one or more arms 17 of the bracket 16 and/or the housing 40. As mentioned above, the housing 40, which will be described in greater detail below, can be releasably coupled to the bracket 16.

Figure 4:
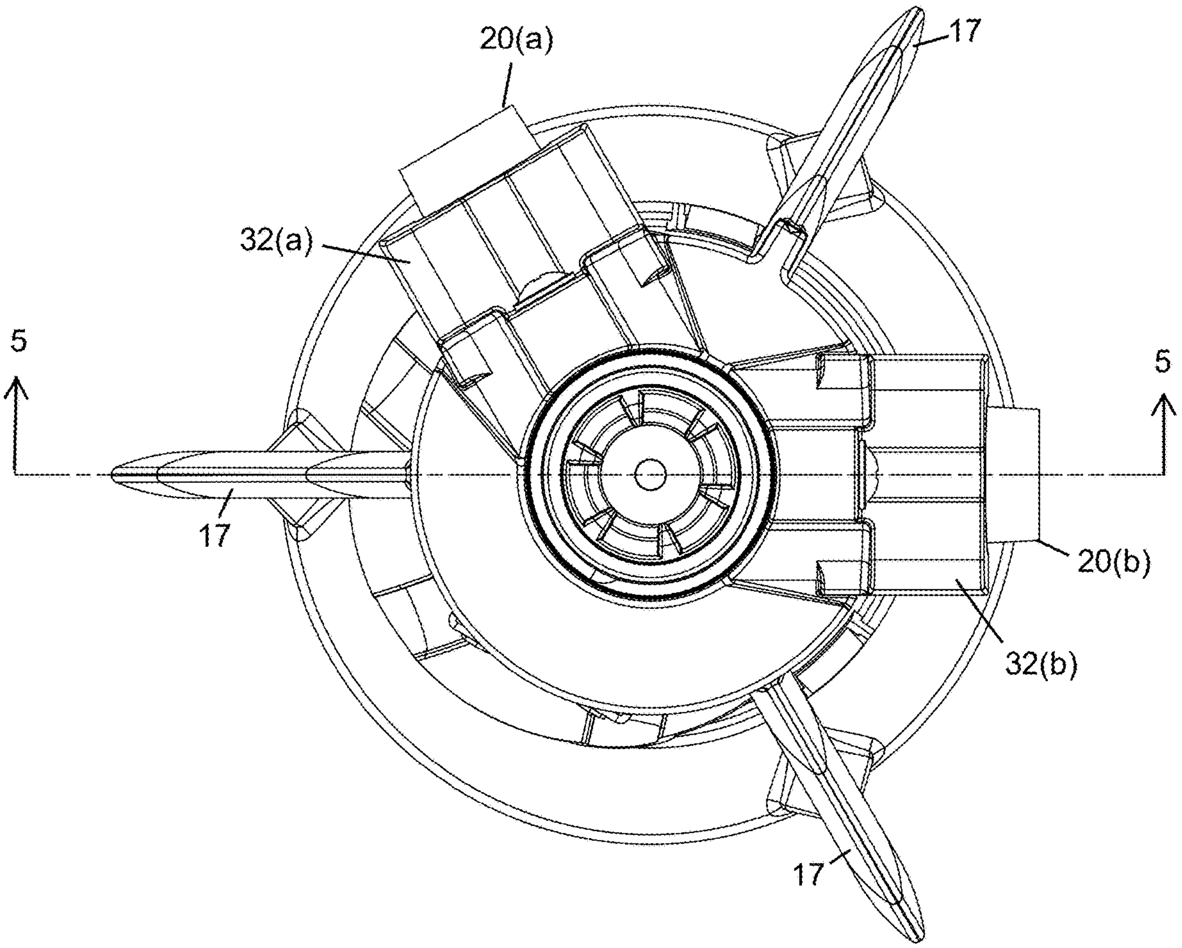
FIG. 4 is a top view of the sprinkler of FIG. 1 showing two spare nozzles releasably coupled to two nozzle carriers on the inlet.

FIG. 4 is a top view of the sprinkler 10 of FIG. 1 showing two spare nozzles 20(*a*), 20(*b*) releasably coupled to two nozzle carriers 32(*a*), 32(*b*). In some embodiments, the sprinkler 10 can include only one carrier 32(*a*) to hold one spare nozzle 20(*a*). In some embodiments, the sprinkler 10 can have more than two carriers 32(*a*), 32(*b*) for holding more than two spare nozzles 20(*a*), 20(*b*).

In the illustrated embodiment, the one or more nozzle carriers 32(*a*), 32(*b*) are coupled to the inlet 14 of the sprinkler 10. In other embodiments, the one or more nozzle carriers 32(*a*), 32(*b*) are coupled to other components of the sprinkler 10 such as, for example, the housing 40 or the bracket 16.

In some embodiments, the one or more carriers 32(*a*), 32(*b*) are manufactured as an integral component with the inlet 14. In other embodiments, each of the one or more carriers 32(*a*), 32(*b*) are separately manufactured and subsequently coupled to the inlet 14. For example, in some embodiments, an outer surface of the inlet 14 comprises one or more receptacles or nubs 36 (see FIG. 5). In some embodiments, each nub 36 extends in a radial direction away from the inlet 14 and is configured to engage with a portion of the carrier 32(*a*), 32(*b*) to facilitate securement of the carrier 32(*a*), 32(*b*) to the inlet 14. In some embodiments, a fastener 34 is employed to secure the carrier 32(*a*), 32(*b*) to its respective nub 36. In this way, the one or more carriers 32(*a*), 32(*b*) can be removed and replaced relative to the inlet 14.

Figure 5:
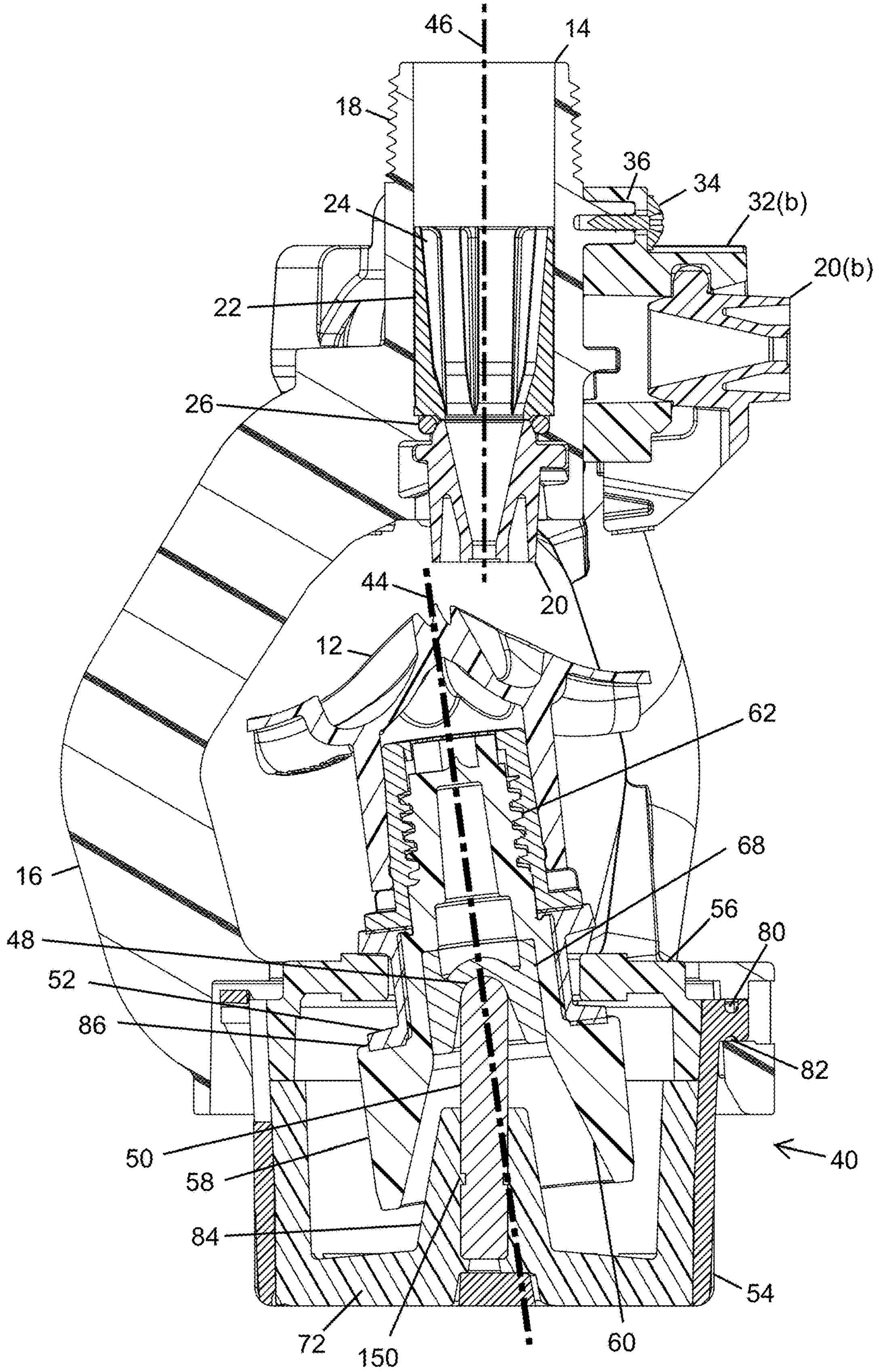
FIG. 5 is a cross-sectional view of the sprinkler of FIG. 1, as viewed along the cut-plane 5-5 of FIG. 4, showing the distribution plate of a deflector assembly located downstream of the nozzle and temporarily positioned so that a central axis of the distribution plate is off axis from a longitudinal axis of the nozzle.

FIG. 5 is a cross-sectional view of the sprinkler 10 of FIG. 1, as viewed along the cut-plane 5-5 of FIG. 4, showing the distribution plate 12 located downstream of the nozzle 20 and temporarily positioned so that the central axis 44 of the distribution plate 12 is off axis from the longitudinal axis 46 of the nozzle 20. In some embodiments, the entire deflector assembly 38, including the distribution plate 12, is located downstream of the nozzle 20. In the illustrated embodiment, the entire deflector assembly 38, including the distribution plate 12, is located downstream of a plane defined by the exit from the nozzle 20. In this way, no portion of the deflector assembly 38 can contact the sprinkler 10 at a location that is upstream of the exit plane and interfere with operation of the sprinkler 10.

In some embodiments, the sprinkler 10 includes a seal retainer 22. In some embodiments, the seal retainer 22 is disposed in the inlet 14. In some embodiments, the seal retainer 22 can be connected to the bracket 16. In some embodiments, the seal retainer 22 can be removably connected to the bracket 16. In some embodiments, the nozzle 20 can be coupled to the bracket 16 and positioned downstream from the seal retainer 22. The seal retainer 22 has an internal flow path. In some embodiments, at least a portion of the internal flow path can be straight, substantially straight, and/or tapered inward between an upstream end of the seal retainer 22 and a downstream end of the seal retainer 22.

In some embodiments, the seal retainer 22 can have one or more vanes 24 formed in the internal flow path. In certain embodiments, the one or more vanes 24 are sized and shaped to straighten water passing through the seal retainer 22 and flowing towards the nozzle 20. The vanes 24 can reduce turbulence in the water as the water moves from the inlet 14 to the nozzle 20.

In some embodiments, the sprinkler 10 includes a seal 26. In some embodiments, the seal 26 is in the form of an O-ring. In some embodiments, the seal 26 can be positioned downstream of the seal retainer 22 to prevent pressurized water from leaking between the seal retainer 22 and the nozzle 20. The upstream end of the seal retainer 22 can be positioned flush or downstream of the inlet 14 and/or the bracket 16.

The nozzle 20 can be removed and reinstalled to position the nozzle 20 on the bracket 16 without any tools. As illustrated most clearly in FIGS. 3 and 5, a user can pinch tabs 28 and 30 on the nozzle 20 and then move the nozzle 20 slightly downwards to disengage the nozzle 20 from the bracket 16 and then laterally to remove the nozzle 20 from the sprinkler 10. The nozzle 20 similarly can be replaced by reversing the procedure. In some embodiments, the nozzle 20 can be similar to, or the same as the nozzle disclosed in assignee's U.S. Pat. No. 8,556,196, titled QUICK CHANGE NOZZLE of Lawyer et. al., issued on Oct. 15, 2013, the entirety of which is hereby incorporated herein by reference. The nozzle 20 can also include an internal taper to accelerate and/or pressurize water flow out from the nozzle 20.

The bracket 16 can support a bearing 48 relative to the inlet 14. In the illustrated embodiment, the bearing 48 is disposed on the opposite side of the distribution plate 12 from the inlet 14. In some embodiments, the bearing 48 can be positioned downstream of the distribution plate 12. In some embodiments, the bearing 48 can act as a pivot point for the radial and side-to-side motion of the deflector assembly 38.

In some embodiments, the bearing 48 is positioned so as to be elevated a distance away from a bottom of the sprinkler 10. In some embodiments, the distance the bearing 48 is elevated from the bottom of the sprinkler 10 is selected so that the bearing 48 is located within the housing 40. In some embodiments, the distance the bearing 48 is elevated from the bottom of the sprinkler 10 is selected so that a horizontal plane passes through both a portion of the bearing 48 and a portion of an upper portion 56 of the housing 40. In some embodiments, the distance the bearing 48 is elevated from the bottom of the sprinkler 10 is selected so that a horizontal plane passes through both a portion of the bearing 48 and a portion of a wear sleeve 52. The bearing 48 and the top of the shaft 50 can be formed to have a very low resistance to movement to facilitate very easy starting characteristics. During normal operation, the bearing 48 may not be subject to high pressures or significant motion. The positioning of the bearing 48 relative to the wear sleeve 52 can cause the majority of the wear to be at the wear sleeve 52 during normal operation and very little to no wear at the bearing 48. In some embodiments, the top of the shaft 50 can be positioned below the center of the wear sleeve 52 during normal operation so that all, or most of the action of the deflector assembly 38 happens above the top of the shaft 50 to prevent, or reduce load and wear on the bearing 48.

In some embodiments, by elevating the bearing 48, the bearing 48 can be positioned closer to the distribution plate 12. In some embodiments, by elevating the bearing 48, the bearing 48 can be positioned near the upper portion 56 of the housing 40. In some embodiments, by elevating the bearing 48, a portion of the deflector assembly 38 can be disposed below the bearing 48 and in the housing 40. In some embodiments, the portion of the deflector assembly 38 disposed below the bearing 48 is more than a third of the entire deflector assembly 38. In some embodiments, the portion of the deflector assembly 38 disposed below the bearing 48 is selected to facilitate nutation of the deflector assembly 38. In some embodiments, the portion of the deflector assembly 38 disposed below the bearing 48 is selected so that a resulting center of mass of the deflector assembly 38 is coplanar, slight below, or slight above the bearing 48.

The bearing 48 can have a spherical or substantially spherical shape, or otherwise a curved surface. In some embodiments, the bearing 48 can be a separate component, such as a ball bearing, installed into the sprinkler 10 or a curved surface of the sprinkler 10. In this way, the bearing 48 can support the deflector assembly 38 and provide a bearing surface upon which the deflector assembly 38 can move radially and from side to side. In the illustrated embodiment, the bearing 48 is a surface on a distal end of a shaft 50. In the illustrated embodiment, the shaft 50 extends in an upward direction within the housing 40.

In some embodiments, the shaft 50 is supported by the housing 40. In the illustrated embodiment, the shaft 50 is supported by a boss 84 or other mounting feature of a weight 72 disposed within the housing 40. In some embodiments, the boss 84 is configured to receive a portion of the shaft 50 in a press-fit manner. In some embodiments, a surface of the shaft 50 includes a groove or other locking feature configured to engage with a complementary locking feature of the boss 84 so as to secure the shaft 50 to the boss 84. In some embodiments, the shaft 50 is inserted into the boss 84 and then rotated to a locked position. In some embodiments, at least a portion of the shaft 50 is knurled to enhance locking of the shaft 50 to the boss 84.

In some embodiments, the weight 72 is molded around at least a portion of the shaft 50. In some embodiments, the shaft 50 is inserted into the mold that forms the weight 72. When the weight 72 is formed in the mold, at least a portion of the weights 72 surrounds at least a portion of the shaft 50. In some embodiments, the weight 72 and the shaft 50 are formed as a single unit. In some embodiments, the shaft 50 is permanently connected to the weight 72 preventing the shaft 50 from being separated from the weight 72 without making at least either the weight 72 or the shaft 50 unusable. In some embodiments, at least a portion of the shaft 50 can be knurled, or otherwise deformed to increase the strength of a joint between the shaft 50 and the weight 72. In some embodiments, an outer surface of the shaft 50 can include at least one groove 150. In some embodiments, material of the weight 72 can flow into the at least one groove 150 to strengthen the joint between the shaft 50 and the weight 72 and prevent the shaft 50 from separating from the weight 72.

In some embodiments, an outer surface of the boss 84 has a truncated conical shape or other preferred shape. In some embodiments, the outer surface of the boss 84 has a shape complementary to the shape of the receptacle 60 that does not interfere with the radial and side-to-side motion of the deflector assembly 38.

The bracket 16 can further support the wear member or wear sleeve 52. In some embodiments, the wear sleeve 52 can be positioned at or downstream of the distribution plate 12. In some embodiments, at least a portion of the wear sleeve 52 is positioned between the deflector assembly 38 and the housing 40. In some embodiments, the wear sleeve 52 is positioned between an outer surface of the deflector assembly 38 and an inner surface of the housing 40.

In some embodiments, the wear sleeve 52 can surround a portion of the deflector assembly 38. In some embodiments, the wear sleeve 52 forms a full circle around a portion of the deflector assembly 38. In some embodiments, the wear sleeve 52 forms only a portion of a circle. In some embodiments, the wear sleeve 52 has a continuous circumference. In some embodiments, the circumference of the wear sleeve 52 is discontinuous. In some embodiments, the wear sleeve 52 has a gap between ends of the wear sleeve 52. In some embodiments, the wear sleeve 52 is manufactured in two parts which are assembled together on the sprinkler 10. In some embodiments, the wear sleeve 52 is manufactured in three parts which are assembled together on the sprinkler 10.

In some embodiment, a cross-section of the wear sleeve 52 has a linear shape. In some embodiment, the cross-section of the wear sleeve 52 has a curved shape such as an L-shape. In the illustrated embodiment, the cross-section of the wear sleeve 52 is C-shaped. In some embodiment, the cross-section of the wear sleeve 52 is symmetrical. In some embodiment, the cross-section of the wear sleeve 52 is asymmetrical.

In some embodiments, the wear sleeve 52 is positioned to focus intermittent or transitory contact between the deflector assembly 38 and the sprinkler 10 during operation of the sprinkler 10 on a surface of the wear sleeve 52. In some embodiments where the wear sleeve 52 has a curved shape such as an L or C-shape, the contact between the deflector assembly 38 and the sprinkler 10 can occur on multiple surfaces of the wear sleeve 52. The shape and/or position of the wear sleeve 52 with respect to one or more of the bearing 48, the distribution plate 12, and the deflector assembly 38 can advantageously reduce wear and extend the usable life of the sprinkler 10.

In the illustrated embodiment, a range of the radial and side-to-side motion of the deflector assembly 38 upon the bearing 48 is limited by the wear sleeve 52. In this way, any resulting forces due to the deflector assembly 38 nutating during operation of the sprinkler 10 passes through the wear sleeve 52 and the bearing 48. By limiting the range of motion of the deflector assembly 38, the wear sleeve 52 keeps the distribution plate 12 in a working alignment with the longitudinal axis of the nozzle 20. The working alignment can allow water out of the nozzle 20 to be directed to the distribution plate 12.

As mentioned above, in some embodiments, the wear sleeve 52 is positioned between at least a portion of the outer surface of the deflector assembly 38 and at least a portion of the inner surface of the housing 40. For example, the wear sleeve 52 can be positioned on the outer surface of the deflector assembly 38 and/or on the inner surface of the housing 40. In the illustrated embodiment and as will be further explained below with respect to FIG. 6, the wear sleeve 52 is disposed on or carried by the deflector assembly 38. In some embodiments, the wear sleeve 52 is disposed on or carried by the housing 40. As shown in FIG. 5 and in some embodiments, the wear sleeve 52 is the only transitory or intermittent contact portion of the deflector assembly 38 with the remainder of the sprinkler 10.

With continued reference to FIG. 5, the deflector assembly 38 can be supported by the bearing 48. All or substantially all of the weight of the deflector assembly 38 can be positioned on the bearing 48 when water is not applied. The weight on the bearing 48 can cause the wear sleeve 52 and the central axis 44 of the distribution plate 12 to be off-axis from the center axis 46, which can be the longitudinal axis 46 of the nozzle 20, when water is not being applied to the sprinkler 10. The pre-tilting of the distribution plate 12 can cause the water from the nozzle 20 to apply more force to one side of the distribution plate 12 than to an opposite side of the distribution plate 12. The unequal weight distribution on the distribution plate 12 can cause the wear sleeve 52 to move towards an opposite side of the housing 40 and start the nutating (for example, rotating and wobbling) action of the distribution plate 12 when the pressurized water is supplied to the sprinkler 10. In some embodiments, the pre-tilting of the distribution plate 12 can reduce the likelihood of prolonged alignment between the central axis 44 of the distribution plate 12 and the longitudinal axis 46 of the nozzle 20 when water first impinges the distribution plate 12.

Figure 6:
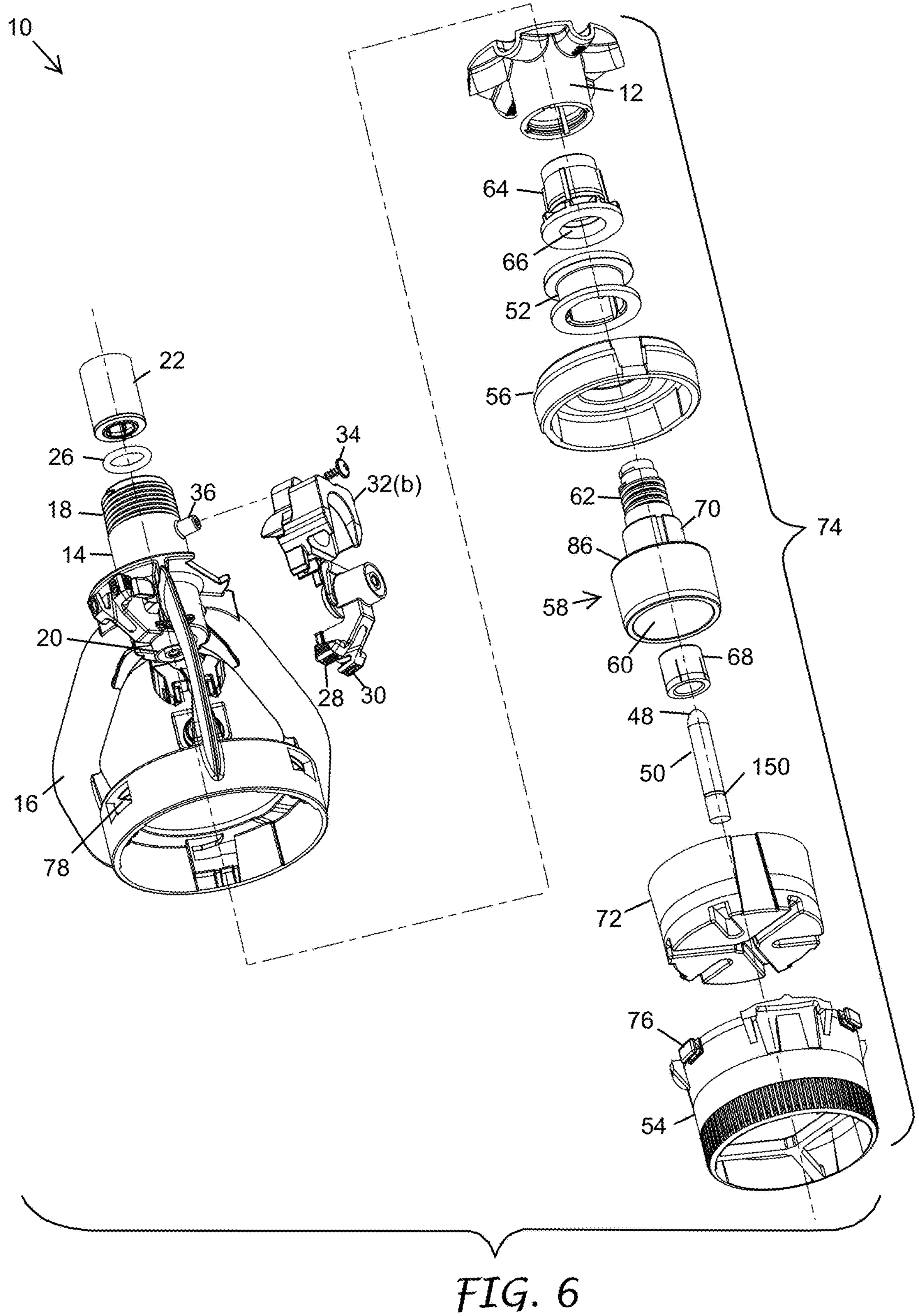
FIG. 6 is a perspective exploded view of the sprinkler of FIG. 1.

FIG. 6 is a perspective exploded view of the sprinkler 10 of FIG. 1. In some embodiments, the deflector assembly 38 can include a spindle 58 extending from the distribution plate 12 on the opposite side of the distribution plate 12 than the one or more grooves 42. In some embodiments, the spindle 58 directly couples the distribution plate 12 to the bearing 48. In some embodiments, the spindle 58 indirectly couples the distribution plate 12 to the bearing 48 via one or more other components.

In the illustrated embodiment, the spindle 58 includes an outer thread 62 for engagement with an inner thread 66. In some embodiments, the inner thread 66 is disposed on the distribution plate 12. In the illustrated embodiment, the inner thread 66 is disposed on an insert 64 that is press-fit or otherwise coupled to the distribution plate 12. In some embodiments, the insert 64 can also be removably attached to the distribution plate 12 by using bayonet mounts, snap rings, keys, collars, or other attachment methods (e.g., attachment structures or methods that do not require use of tools or specialized tools for disconnection).

In some embodiments, the bearing 48 can be positioned between the spindle 58 and the housing 40 and/or the bracket 16 when assembled. In some embodiments, the bearing 48 can be a surface of the housing 40. In some embodiments, the bearing 48 can be removably attached to the housing 40.

As illustrated in FIG. 6, the bearing 48 can be an upper or distal surface of the shaft 50. The bearing 48 can have a spherical or substantially spherical shape, or otherwise a curved surface. The shaft 50 can be supported by the housing 40. In the illustrated embodiment, a proximal end of the shaft 50 is coupled to a receptacle in the weight 72. In some embodiments, the shaft 50 is coupled to the lower or upper portions 54, 56 of the housing 40. In some embodiments, the shaft 50 is coupled to the bracket 16 such as to, for example, the lower collar of the bracket 16. The bearing 48 can support the deflector assembly 38 when water is not applied to the sprinkler 10, and/or provide a smooth surface for the deflector assembly 38 to move relative to the housing 40.

In some embodiments, the spindle 58 includes a receptacle 60 configured to receive at least a portion of the shaft 50. In some embodiments, the receptacle 60 can be a cone shape or other preferred concave surface. In some embodiments, the receptacle 60 is sized and shaped larger than the shaft 50 so that only the bearing 48 portion of the shaft 50 contacts the spindle 58 over a range of the radial and side-to-side motion of the deflector assembly 38. In some embodiments, the portion of the spindle 58 in the receptacle 60 that contacts the bearing 48 has a shape complementary to the shape of the bearing 48 that does not interfere with the radial and side-to-side motion of the deflector assembly 38.

In some embodiments, the bearing 48 portion of the shaft 50 directly contacts the spindle 58. In some embodiments, the bearing 48 portion of the shaft 50 supports the spindle 58 via one or more other components. In the illustrated embodiment, a bearing insert 68 is disposed in the receptacle 60 and between the bearing 48 portion of the shaft 50 and the spindle 58.

In some embodiments, the bearing insert 68 can be formed in the receptacle 60 of the spindle 58. In some embodiments, the bearing insert 68 can be a cone shape or other preferred concave surface. In some embodiments, the bearing insert 68 can be a cup shaped shaft bearing. In some embodiments, the bearing insert 68 is sized to fit over the bearing 48 portion of the shaft 50. In some embodiments, the bearing insert 68 is press-fit into the receptacle 60. In some embodiments, the bearing insert 68 can also be removably attached in the receptacle 60 by using bayonet mounts, snap rings, keys, collars, or other attachment methods (e.g., attachment structures or methods that do not require use of tools or specialized tools for disconnection). In some embodiments, a surface of the bearing insert 68 contacting the bearing 48 has a shape complementary to the shape of the bearing 48.

The bearing insert 68 can allow the deflector assembly 38 to rotatably pivot at the bearing 48 as well as slide or translate relative to the curved surface of the bearing 48. In the illustrated embodiment when assembled, the bearing 48 portion of the shaft 50 loosely couples to the surface of the bearing insert 68 such that the deflector assembly 38 can wobble (e.g., tilt, oscillate, bounce, shake, or otherwise move) and rotate when pressurized water from the nozzle 20 impinges on the distribution plate 12.

In some embodiments, the wear sleeve 52 is carried by a portion of the spindle 58 of the deflector assembly 38. As is illustrated in FIGS. 5 and 6 and in some embodiments, the spindle 58 carries the wear sleeve 52 about its outer circumference. For example, the wear sleeve 52 can be installed around a surface 70 formed on the outer circumference of the spindle 58 between an end of the insert 64 and a ridge 86 of the spindle 58. In this way, the wear sleeve 52 abuts against the insert 64 and the ridge 86 so as to maintain a position of the wear sleeve 52 along the outer circumference of the spindle 58 during use of the sprinkler 10. The wear sleeve 52 can contact an inner surface of the housing 40 during use of the sprinkler 10, including normal operation of the sprinkler 10.

In some embodiments, contacts between one or more surfaces of the wear sleeve 52 and the inner surface of the housing 40 can restrict the angular movement of the deflector assembly 38 and maintain a correct position of the deflector assembly 38 relative to the nozzle 20 during normal operation. The correct position can allow water out of the nozzle 20 to impinge on the distribution plate 12.

In some embodiments, the wear sleeve 52 can provide a resistive interface between the deflector assembly 38 and the housing 40 to slow or otherwise regulate the speed of rotation of the distribution plate 12 during operation of the sprinkler 10.

In some embodiments, the wear sleeve 52 can be a pliable, elastic, resilient, and/or flexible material that can cushion the impact of the deflector assembly 38 relative to the housing 40 during operation.

Still referring to FIG. 6, in some embodiments, the housing 40 includes a lower portion 54 and the upper portion 56 mentioned above. In some embodiments, the weight 72 is disposed at least partially within the housing 40. In the illustrated embodiment, the weight 72 can be installed at least partially inside of the lower portion 54. The upper portion 56 can be place over the weight 72 to retain the weight 72 between the lower portion 54 and the upper portion 56. In some embodiments, the weight 72 is a dense material. In some embodiments, the weight 72 comprises a metal such as zinc. In some embodiments, the weight 72 is die cast. In some embodiments, the weight 72 comprises a plurality of small weights such as shot. In some embodiments, the weight 72 comprises a liquid. In some embodiments, the weight 62 is positioned at or near the downstream end of the sprinkler 10 to reduce vibration of the sprinkler 10 during normal operation.

In some embodiments, the housing 40 is removable from the sprinkler 10. In some embodiments, the lower portion 54 can be removably attached to the bracket 16. In some embodiments, the upper portion 56 is only removable when the lower portion 54 is not installed to the bracket 16.

In some embodiments, the deflector assembly 38 and the housing 40 together form a subassembly 74 which together couples to the bracket 16 via the lower portion 54 of the housing 40. In this way, the subassembly 74 including the deflector assembly 38 and the housing 40 is removed from the sprinkler 10 by the user simply decoupling the lower portion 54 from the bracket 16.

In some embodiments, the lower portion 54 can include one or more attaching tabs 76. The bracket 16 can have openings 78 configured to receive the attaching tabs 76. The openings 78 can be located on the collar connecting downstream ends of the plurality of arms 17 of the bracket 16.

In some embodiments there can be three attaching tabs 76 and three openings 78. In some embodiments there can be fewer than three attaching tabs 76 and openings 78. In some embodiments there can be more than three attaching tabs 76 and openings 78. The attaching tabs 76 and/or the openings 78 can be substantially uniformly spaced or otherwise around the lower portion 54 and/or the bracket 16. Each of the attaching tabs 76 can engage one of the openings 78 to removably couple the lower portion 54 to the bracket 16. The lower portion 54 can be at least partially disposed within a cavity of the bracket 16 (such as within a cavity of the collar) when coupled to the bracket 16.

In some embodiments, a wear bumper 80 can surround (for example, completely surround) each of the attaching tabs 76. In some embodiments, the attaching tabs 76 can each have a groove 82 to retain the wear bumper 80. In some embodiments, the wear bumper 80 can fill at least a portion of any open space between the attaching tab 76 and the opening 78. In some embodiments, the lower portion 54 can be coupled to the bracket 16 with each of the openings 78 surrounding at least a portion of each of the attaching tabs 76 and each of the wear bumpers 80.

In some embodiments, the openings 78 can also form a bayonet locking mechanism so that the lower portion 54 can be rotated to a locked position when each of the attaching tabs 76 locks into each of the bayonet locks formed at the opening 78. A user can also look through the openings 78 and visually verify that the attaching tabs 76 are in the locked position. In some embodiments, a bayonet locking mechanism can be formed or otherwise positioned in the bracket 16 without the openings 78.

Figure 7:
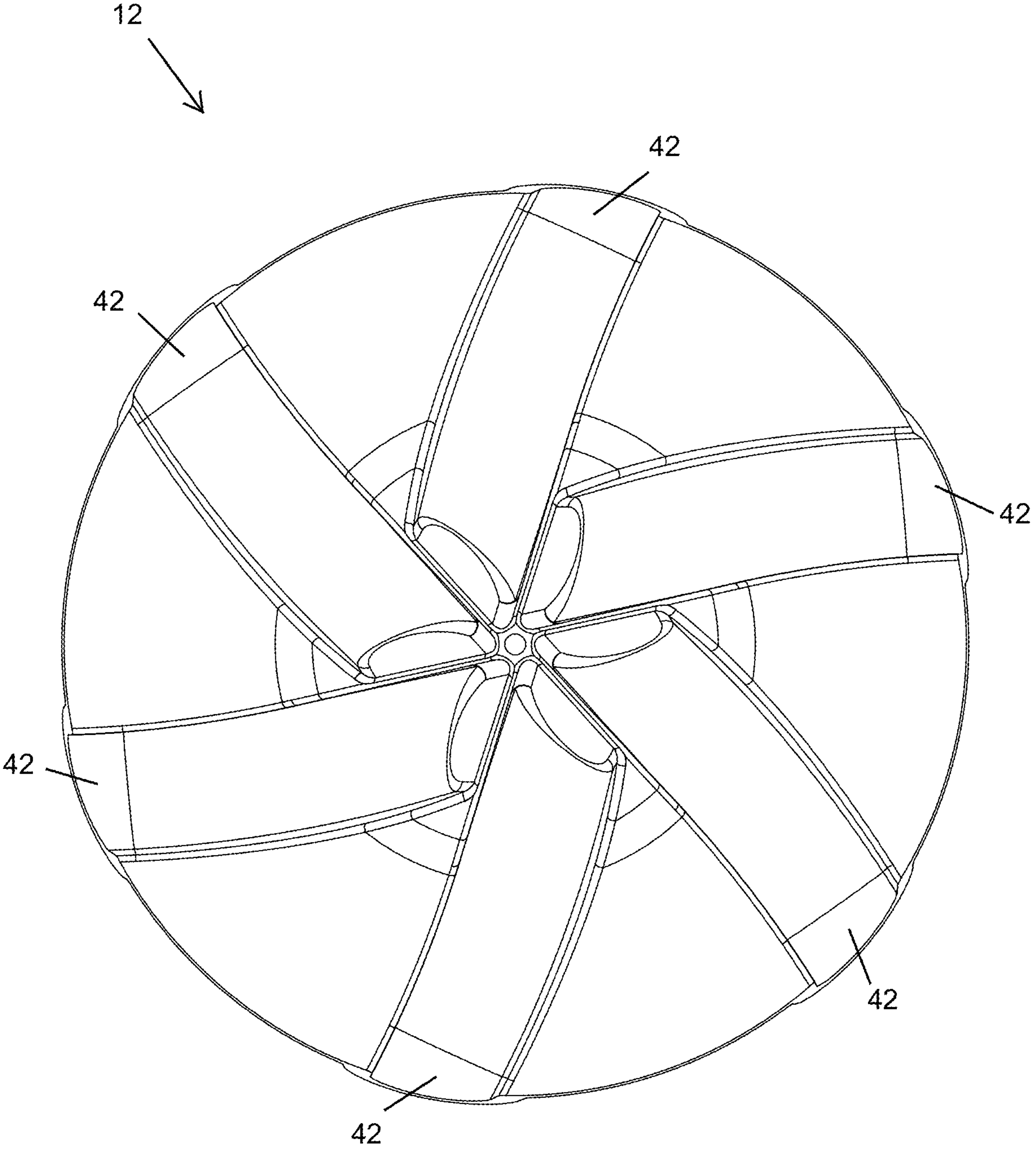
FIG. 7 is a top view of the distribution plate of the sprinkler of FIG. 1 showing the one or more grooves radially angled to cause the distribution plate to rotate in a counter clockwise direction when the water from the nozzle impinges on the distribution plate.

FIG. 7 is a top view of the distribution plate 12 of the sprinkler 10 of FIG. 1 showing the one or more grooves 42 radially angled to cause the distribution plate 12 to rotate in a counter clockwise direction when the water from the nozzle 20 impinges on the distribution plate 12. In some embodiments, the one or more grooves 42 are disposed on an upstream side of the distribution plate 12. The upstream side of the distribution plate 12 faces the nozzle 20. The one or more grooves 42 can channel the water exiting the nozzle 20 to be ejected in a controlled direction. In some embodiments, the one or more grooves 42 can be radially angled to cause the deflector assembly 38 to rotate when the water from the nozzle 20 impinges the distribution plate 12. In some embodiments, the one or more grooves 42 can be curved. In some embodiments, such as shown in FIG. 7, the one or more grooves 42 can be identical or substantially identical in shape. The one or more grooves 42 can also be uniformly or substantially uniformly distributed on the upstream side of the distribution plate 12.

Figure 8:
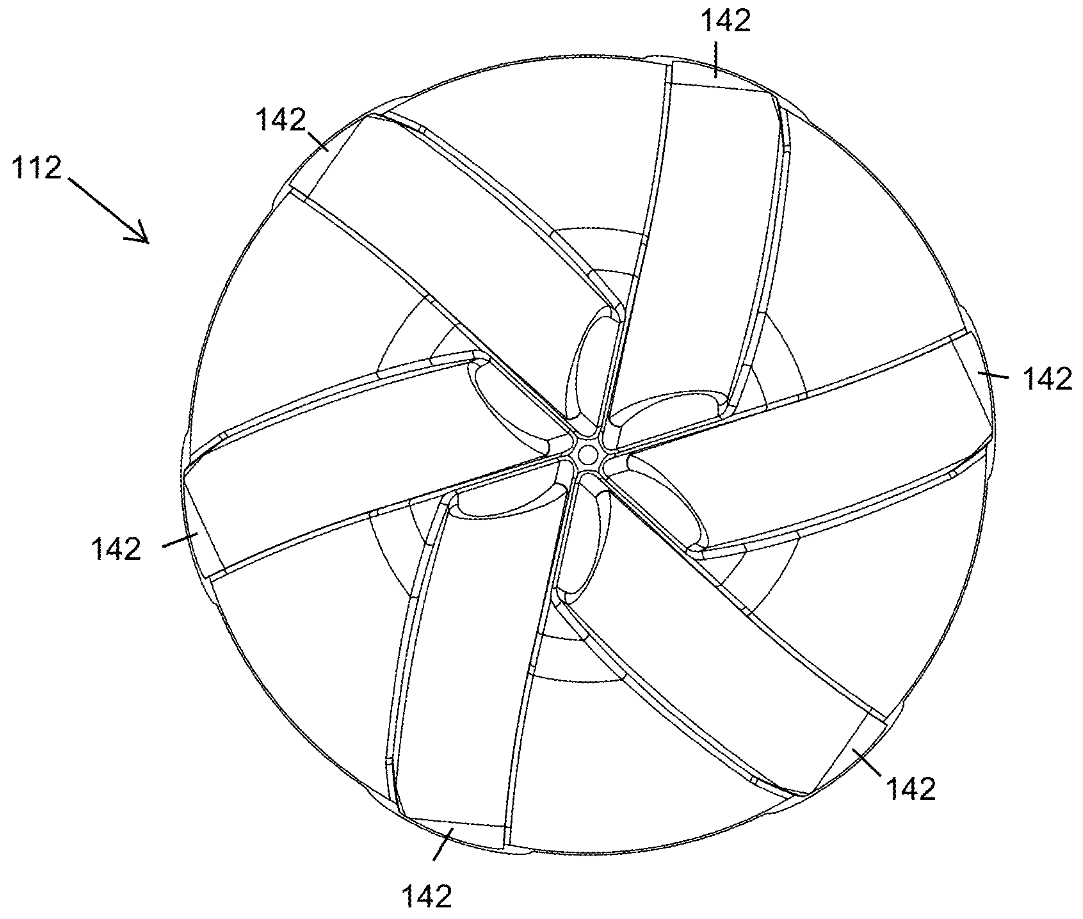
FIG. 8 is a top view of another embodiment of the distribution plate which nutates in a clockwise direction during operation of the sprinkler. In contrast to the one or more grooves illustrated in FIG. 1, the one or more grooves illustrated in FIG. 8 are radially angled to cause the distribution plate to rotate in the clockwise direction when the water from the nozzle impinges on the distribution plate.
Figure 9:
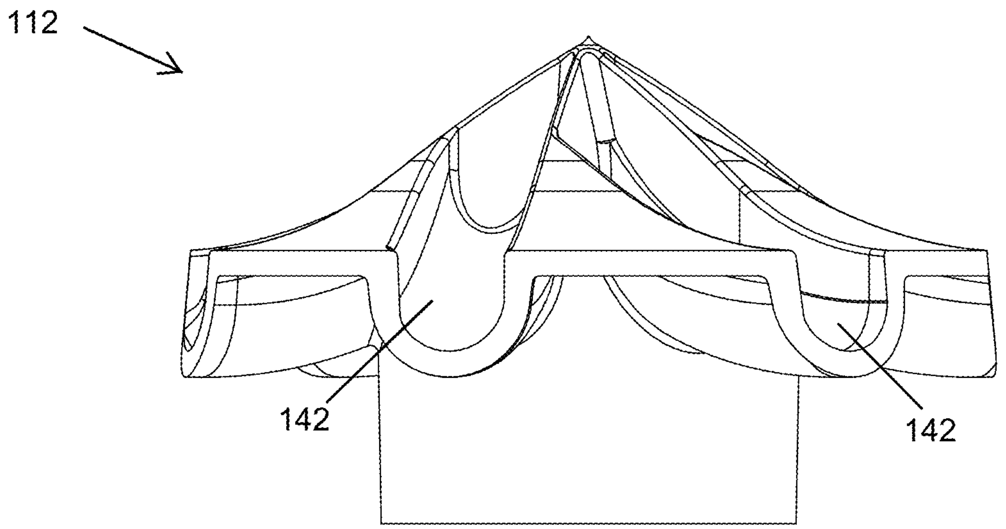
FIG. 9 is a front view of the distribution plate of FIG. 8.

FIG. 8 is a top view of a distribution plate 112 that is similar to the distribution plate 12 illustrated in FIG. 7 except the radial angle of the one or more grooves 142 in FIG. 8 causes the distribution plate 112 to nutate in the clockwise direction when the water from the nozzle 20 impinges on the distribution plate 112. FIG. 9 is a front view of the distribution plate 112 of FIG. 8.

As explained above, the radial angle of the one or more grooves 42, 142 in the distribution plate 12, 112 causes the distribution plate 12, 112 to rotate in the clockwise direction or the counter clockwise direction when the water from the nozzle 20 impinges on the distribution plate 12, 112. For example, the radial angle of the one or more grooves 142 illustrated in FIGS. 8 and 9 causes the distribution plate 112 to rotate in the clockwise direction when the water from the nozzle 20 impinges on the distribution plate 112.

Example Disassembling and Reassembling of Certain Embodiments of a Sprinkler

In some instances, it may be desirable to replace and/or to clean debris from the sprinkler 10. A user may also desire to clean or replace some of the components of the deflector assembly 38. In some embodiments, a user may need to replace, or repair worn or damaged components in the sprinkler 10. Examples of worn or damaged components, and/or components that require cleaning can include but are not limited to the distribution plate 12, the bearing 48, the wear sleeve 52, and/or the bearing insert 68. A user can also remove and reinstall the nozzle 20 and/or spare nozzles without using any tools as described above.

To disassemble the sprinkler 10 to service any worn or damaged parts and/or to clean any parts, a user can detach the lower portion 54 from the bracket 16 by disengaging the attaching tabs 76 from the openings 78. In some embodiments, the user can disengage the attaching tabs 76 from the openings 78 without using any tools. In some embodiments, the user can use a tool such a standard-sized screwdriver to pry the attaching tabs 76 out of the openings 78. In some embodiments, the bracket 16 can comprise at least one bayonet style coupling feature with or without an opening 78. In some embodiments, the user can rotate the lower portion 54 until the attaching tabs 76 are unlocked from the bracket 16 to remove the lower portion 54.

In some embodiments, all of the components of the deflector assembly 38 and the housing 40 can be removed from the bracket 16 and/or all of the components of the deflector assembly 38 including the spindle 58, can be accessible with the removal of the lower portion 54 from the bracket 16. In some embodiments, a user can then disassemble the wear sleeve 52 from the spindle 58 by decoupling the spindle 58 from the insert 64 (including the distribution plate 12) by, for example, disengaging the outer thread 62 from the inner thread 66. Once unscrewed, the wear sleeve 52 is slid off the spindle 58 to replace or repair the wear sleeve 52. In some embodiments, the user may separate the upper portion 56 from the lower portion 54 once the lower portion 54 is decoupled from the bracket 16.

In some embodiments, the user can disengage the deflector assembly 38 from the insert 64 by simply pulling the deflector assembly 38 off the insert 64 preferably when the insert 64 is still engaged with the spindle 58.

The user can also optionally remove the upper portion 56 and/or the weight 72 from the lower portion 54 to clean or replace the shaft 50 or bearing 48. In some embodiments, the shaft 50 can be simply disengaged from the weight 72 by pulling on the shaft 50. In some embodiments, the shaft 50 is removed by rotating the shaft 50 relative to the boss 84 in the weight 72. In some embodiments, the shaft 50 is permanently attached to the weight 72 and the weight 72 and the shaft 50 can be removed and replaced as an assembly. The user can remove the bearing insert 68 from the receptacle 60 in the spindle 58 to clean or replace the bearing insert 68. The user can also optionally remove the wear bumper 80 to clean or replace the wear bumper 80, and/or to clean the retaining grooves 82 of the attaching tabs 76.

In some embodiments, such as illustrated in FIG. 6, every component of the sprinkler 10 can be serviced, cleaned, and/or replaced by a user with minimal tools and effort (such as without any tools, or with off-the-shelf tools like a standard-sized screw driver and/or a standard sized wrench). The user can disassemble the sprinkler components in any order.

The user can reassemble the components to resume normal operation of the sprinkler 10. For example, the user can slide the cleaned or new wear sleeve 52 through the upper portion 56. The user then positions the spindle 58 within the wear sleeve 52 and threads the spindle 58 into the insert 64 which fixedly couples the distribution plate 12 to the spindle 58.

The user can also reassemble the cleaned or new bearing insert 68 into the receptacle 60 in the spindle 58. The user can reinsert the weight 72 (together or separately from the lower portion 54) so that the cleaned or new shaft 50 enters the receptacle 60 in the spindle 58 and positions the bearing 48 portion of the shaft 50 in contact with the bearing insert 68. The user can also re-engage the attaching tabs 76 (which can include mounting the wear bumper 80 onto the attaching tabs 76) and the openings 78 to attach the lower portion 54 to the bracket 16. The user can reassemble the components in any order.

In some embodiments, such as illustrated in FIG. 12, a user can engage a tool with the deflector assembly 38, 138 to prevent the spindle 58, 158 from rotating relative to the housing 40 without disassembling the sprinkler 10, 110. While the tool is engaged, the user can grasp and rotate the distribution plate 12, 112 relative to the spindle 58, 158. This can allow the user to unscrew the distributor plate 12, 112 from the spindle 58, 158 and thread a different distributor plate 12, 112 to the spindle 58, 158 without further disassembling the sprinkler 10, 110.

The ability to service the sprinkler 10 with minimal tools and effort can allow a user to service the sprinkler 10 in the field, which can be more convenient and/or efficient to the user (such as an end-user) than requiring a large number of and/or special tools to assemble and disassemble a sprinkler.

Example Operations of Certain Embodiments of a Sprinkler

Figure 10:
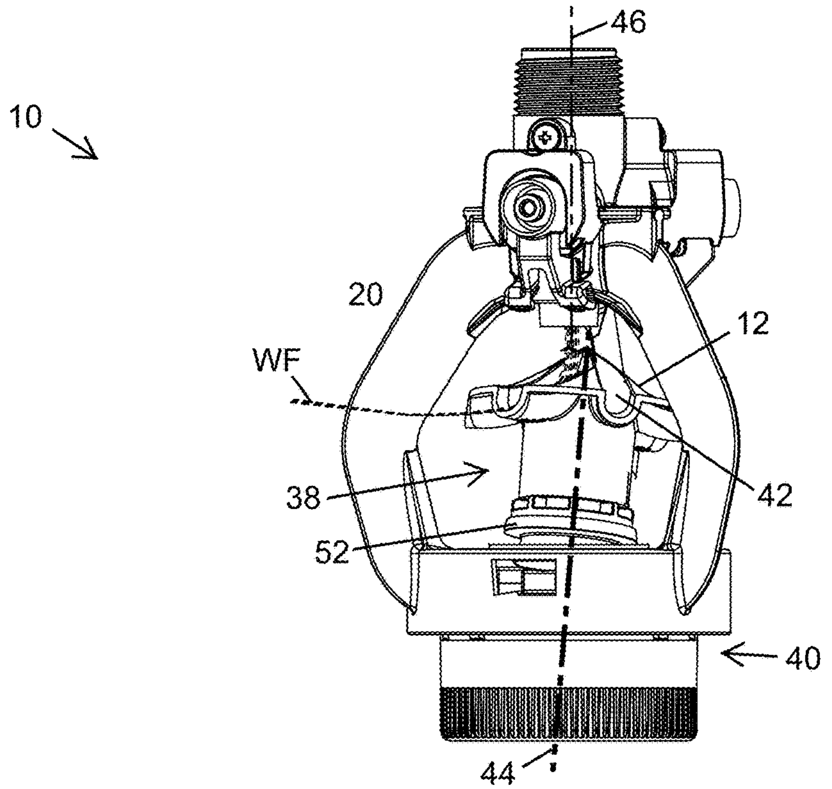
FIG. 10 is a front view of the sprinkler of FIG. 1, as viewed when the distribution plate is in a first tilt position.
Figure 11:
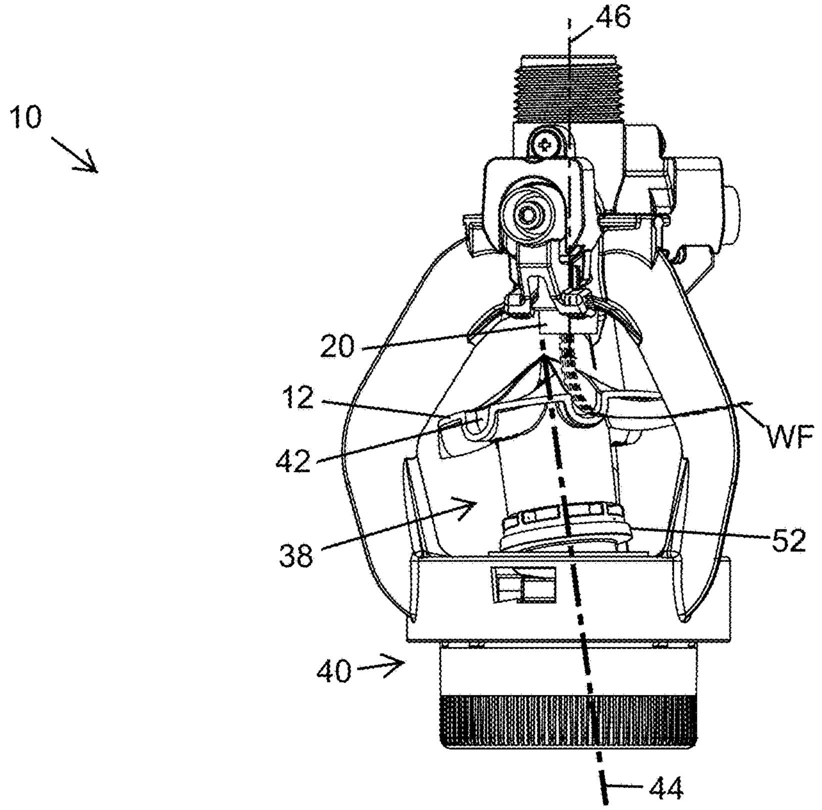
FIG. 11 is a front view of the sprinkler of FIG. 1, as viewed when the distribution plate is in a second tilt position.

FIGS. 10 and 11 illustrate example operations of the sprinkler 10. As illustrated in FIG. 10, when water pressure is applied to the sprinkler 10, water from the nozzle 20 can impinge on the distribution plate 12 and cause the distribution plate 12 to move angularly to a first side or first tilt position (the right hand side as shown in FIG. 10). In some embodiments, the distribution plate 12 can be pre-tilted to the first side or first tilt position. The deflector assembly 38 can move until the wear sleeve 52 contacts the housing 40. Additionally, the deflector assembly 38 can begin to rotate as a result of the water exiting the curved grooves 42. As the deflector assembly 38 rotates, water can be dispersed in different directions. FIG. 10 illustrates the direction of water flow WF away from the distribution plate 12 when the distribution plate 12 is at the first side or first tilt position.

As shown in FIG. 11, the deflector assembly 38 can move to a second side or second tilt position (the left hand side as shown in FIG. 11) relative to the first side illustrated in FIG. 10 as the water impinges on a different area of the distribution plate 12. The direction of water flow WF can change after the deflector assembly 38 has moved to the second side or second tilt position. Continuous rotation of the distribution plate 12 about the central axis 44 combined with the central axis 44 moving back and forth relative to the longitudinal axis 46 of the nozzle 20 can create a nutating movement of the distribution plate 12. The nutating movement of the distribution plate 12 can produce a substantially uniform water flow pattern on the plants being irrigated. The relative positioning of the bearing 48, the bearing insert 68, and the distribution plate 12 in relation to the wear sleeve 52 can reduce and/or minimize forces between the wear sleeve 52 and the housing 40 to reduce wear and/or extend the useable life of the wear sleeve 52.

Figure 15:
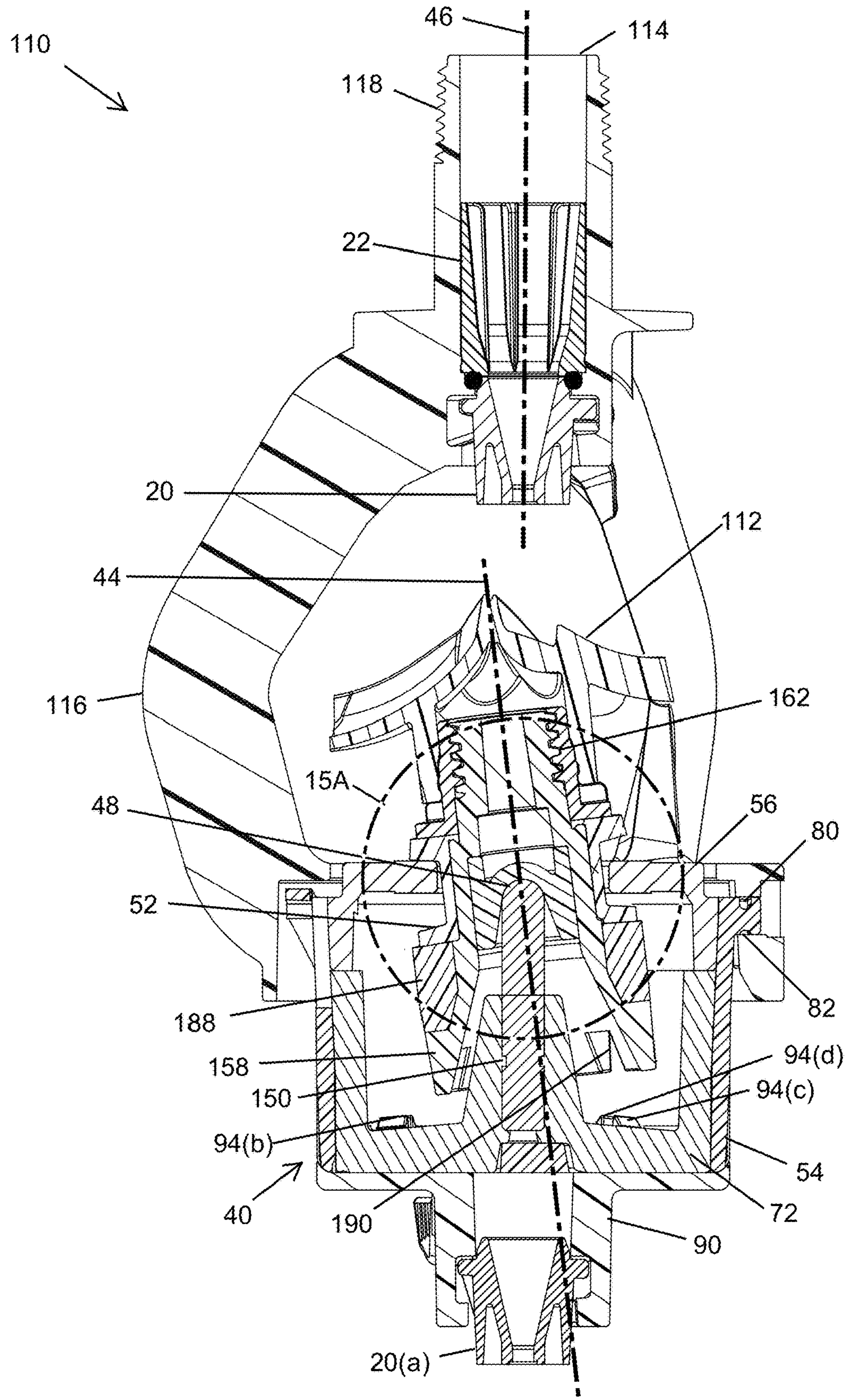
FIG. 15 is a cross-sectional view of the sprinkler of FIG. 12, as viewed along the cut-plane 15-15 of FIG. 14, showing the distribution plate located downstream of the nozzle and temporarily positioned so that a central axis of the distribution plate is off axis from a longitudinal axis of the nozzle.

FIG. 12 is a top perspective view of an embodiment of a sprinkler 110 that is similar to the sprinkler 10 illustrated in FIG. 3 except the distribution plate 12 illustrated in FIG. 3 has been replaced with the distribution plate 112 illustrated in FIG. 8, the location and configuration of the one or more nozzle carriers 32(*a*), 32(*b*) illustrated in FIG. 3 has been changed to a nozzle carrier 90 that is located on an opposite side of the distribution plate 112 from an inlet 114 of the sprinkler 110, and the deflector assembly 138 comprises, for example, one or more weights 188 and one or more notches 190 (see FIG. 15).

Although the sprinkler 10, 110 has been disclosed in the context of certain embodiments and examples, it will be understood by those skilled in the art that the sprinkler 10, 110 can comprise any combination of deflector assembly 38, 138 (e.g., distribution plate 12, 112 and spindle 58, 158) and nozzle carrier 32(*a*), 32(*b*), 90 and still fall within the scope of this disclosure.

The inlet 114 defines an upstream end of the sprinkler 110. The inlet 114 can be configured to connect to a water source (e.g., an arm of an irrigation system, a water line, a hose, or some other source of water). In certain embodiments, the inlet 114 supports a frame or bracket 116. In some embodiments, the inlet 114 can be formed as a part of the bracket 116. In some embodiments, the inlet 114 can be a separate piece that is removably or permanently attached to the bracket 116.

In some embodiments, the inlet 114 is configured to be secured to a water supply line on an irrigation system. In some embodiments, the inlet 114 is at least partially surrounded by threads 118. The threads 118 can be screwed into the water supply line on the irrigation system. In some instances, a pressure regulator can be positioned between the water supply line and the sprinkler 110. The inlet 114 can also be screwed into an outlet of the pressure regulator. Other attachment methods, including, but not limited to, glued connections, bayonet mounts, snap rings, keys, or collars can be used to secure the sprinkler 110 to either a water supply line or a pressure regulator.

The bracket 116 can include one or more arms 117 (for example, one, two, three, four, or more). In embodiments which include a plurality of arms 117, the arms 117 can be spaced apart from one another. As most clearly illustrated in FIG. 14, the illustrated bracket 116 has three arms 117. In some embodiments, one or more of the arms 117 can have an outwardly bulging middle section. The outwardly bulging middle section can be sized and shaped to accommodate movement of the distribution plate 112. The one or more arms 117 can be joined at one or both of their upstream and downstream ends with a collar. In some embodiments, the upstream end of the bracket 116 is closer to the inlet 114 than the downstream end.

In the illustrated embodiment, the distribution plate 112 forms a component of the deflector assembly 138. In some embodiments as explained above, the deflector assembly 138 is supported by the housing 40 so as to allow the deflector assembly 138, which carries the distribution plate 112, to "wobble" in concert with the distribution plate 112. The deflector assembly 138 can be surrounded by the one or more arms 117 of the bracket 116 and/or the housing 40. The housing 40 can be releasably coupled to the bracket 116.

Figure 13:
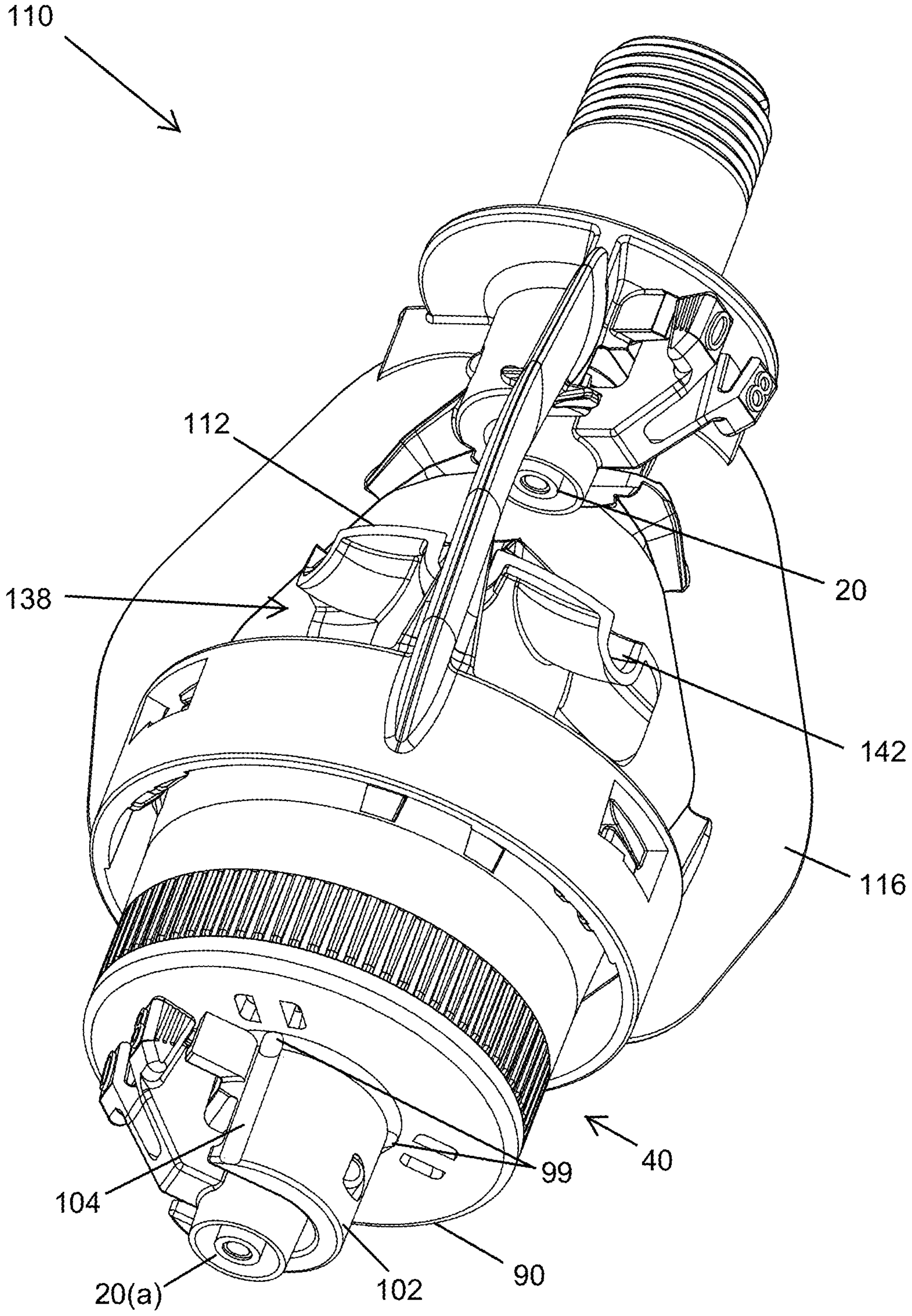
FIG. 13 is a bottom perspective view of the sprinkler of FIG. 12 showing one nozzle carrier configured to be supported by the housing of the sprinkler.
Figure 14:
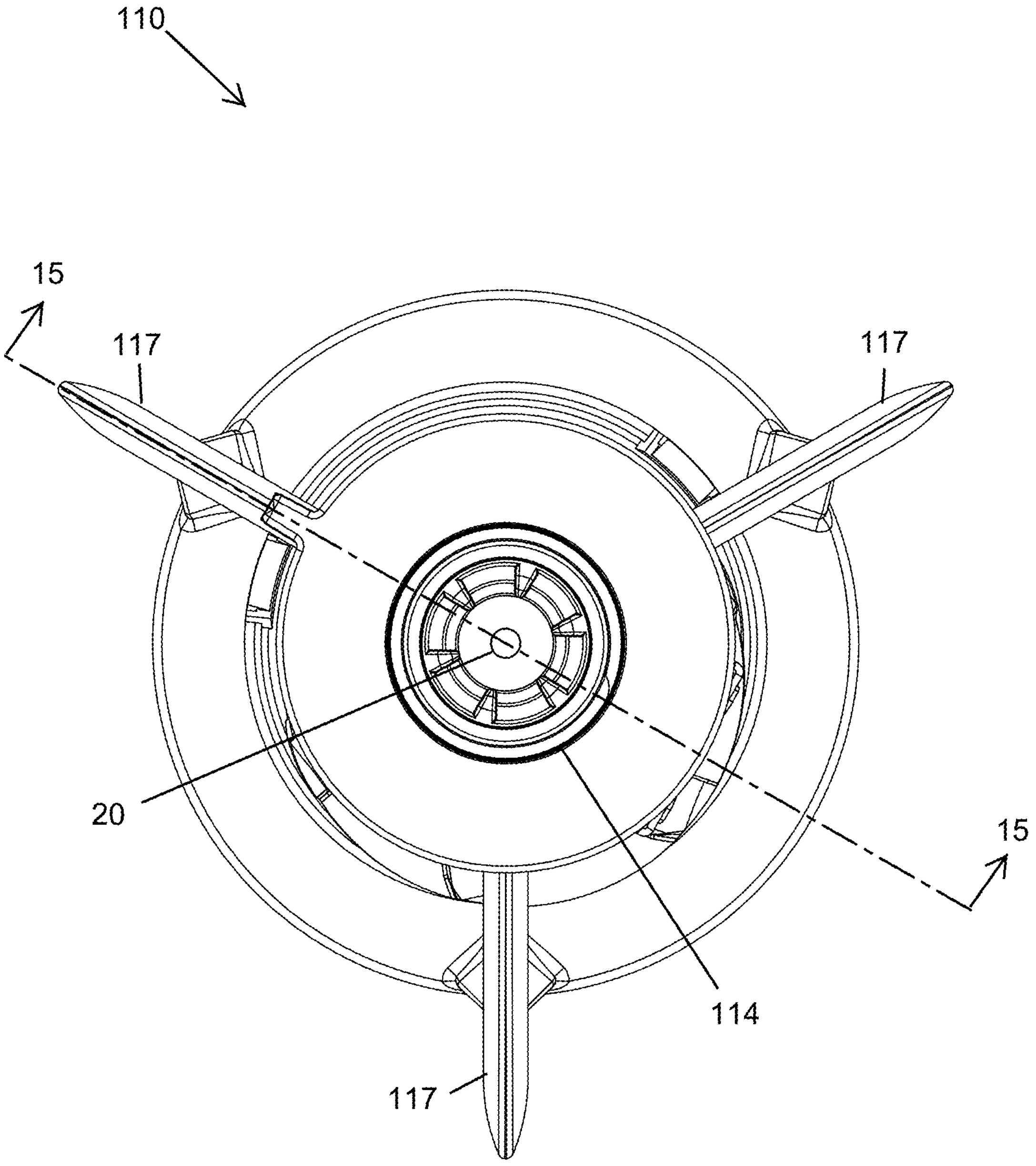
FIG. 14 is a top view of the sprinkler of FIG. 12 showing the inlet end.

FIG. 13 is a bottom perspective view of the sprinkler of FIG. 12 showing one nozzle carrier 90 and one spare nozzle 20(*a*). FIG. 14 is a top view of the sprinkler 110 of FIG. 12 showing the inlet end. In the illustrated embodiment, the nozzle carrier 90 is supported by the housing 40 of the sprinkler 110. The spare nozzle 20(*a*) is releasably coupled to the nozzle carrier 90. In some embodiments, the nozzle carrier 90 can have a hub 102. In some embodiments, the hub 102 is axially extending from the nozzle carrier 90. In some embodiments, the hub 102 can support the spare nozzle 20(*a*). In certain embodiments and as most clearly shown in FIG. 15, the nozzle carrier 90 is coupled to the weight 72 of the housing 40. In other embodiments, the nozzle carrier 90 is coupled to other components of the sprinkler 110 such as, for example, the bracket 116.

FIG. 15 is a cross-sectional view of the sprinkler of FIG. 12, as viewed along the cut-plane 15-15 of FIG. 14, showing the distribution plate 112 located downstream of the nozzle 20 and temporarily positioned so that a central axis 44 of the distribution plate 112 is off axis from a longitudinal axis 46 of the nozzle 20. In the illustrated embodiment, the housing 40 supports the nozzle carrier 90 which supports the spare nozzle 20(*a*).

Figure 15A:
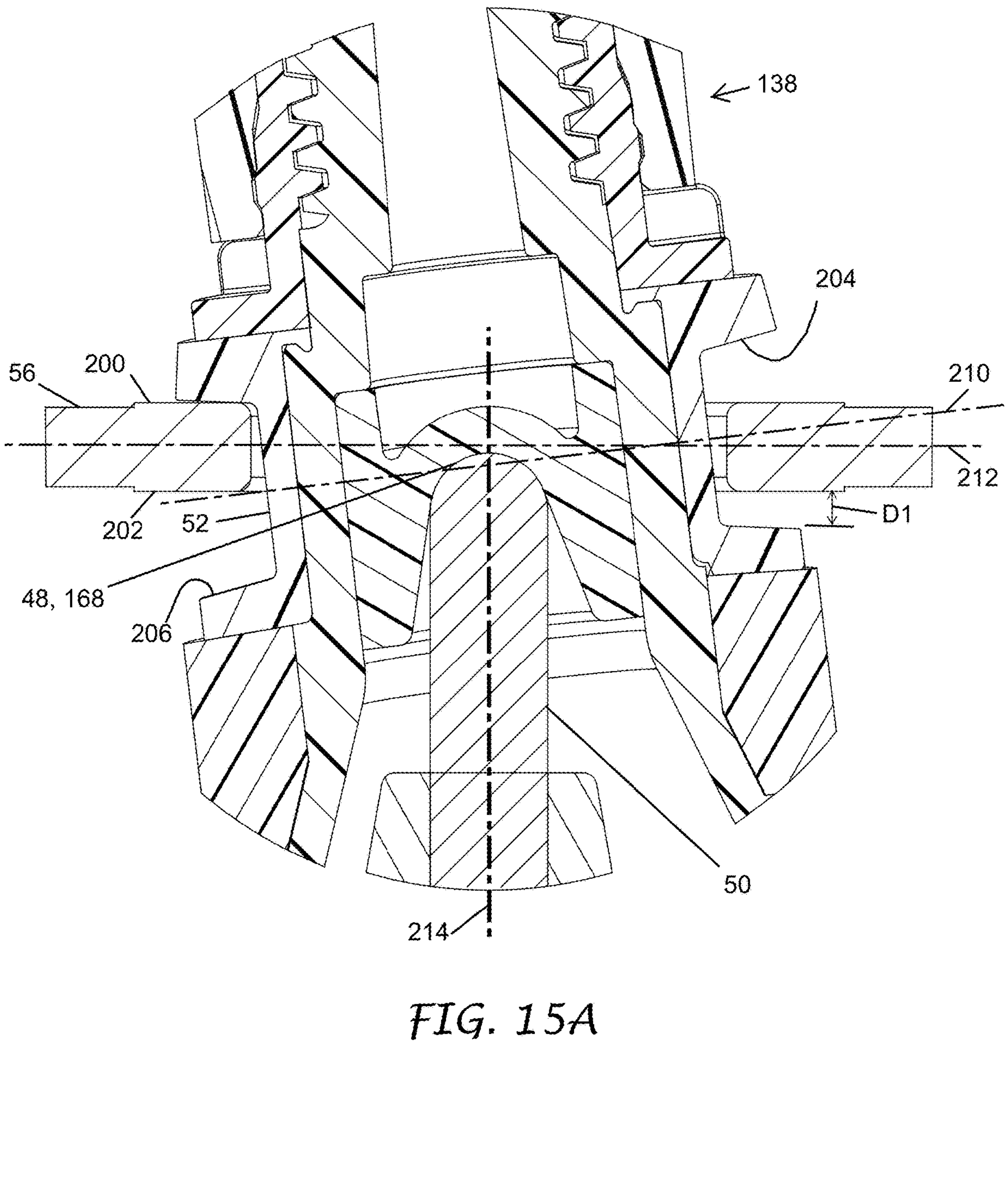
FIG. 15A is an enlarged view of a portion of FIG. 15 showing the position of the wear sleeve relative to the upper portion of the housing when the sprinkler is not pressurized with water and is at rest.

FIG. 15A is an enlarged view of a portion of FIG. 15 showing the position of the wear sleeve 52 relative to the upper portion 56 of the housing 40 when the sprinkler 110 is not pressurized with water and is at rest. In some embodiments, the upper portion 56 can have a first contact surface 200 and a second contact surface 202. In some embodiments, the first contact surface 200 can be on an opposite side of the upper portion 56 than the second contact surface 202. In some embodiments, the wear sleeve 52 can have a first surface 204 and a second surface 206. In some embodiments, a bearing 168 of the bearing insert 68 is configured to rest on the bearing 48 of the shaft 50 when the sprinkler 110 is not pressurized with water and is at rest. In this situation, the weight of the deflector assembly 38, 138 can cause the deflector assembly 38, 138 to lean to one side. In some embodiments when water pressure is not being applied to the sprinkler 110, the first surface 204 can rest on the first contact surface 200 positioning the deflector assembly 38, 138 in a proper position to begin moving when pressurized water begins flowing through the nozzle 20. In some embodiments, the second contact surface 202 can be separated from the second surface 206 at its closest point when the sprinkler 110 is not pressurized with water and is at rest. In some embodiments, the second contact surface 202 and the second surface 206 can be separated a distance D1 at their closest point when the sprinkler 110 is not pressurized with water and is at rest. In some embodiments, surfaces of the bearings 48, 168 can be positioned below a centerline 212 of the upper portion 56 when the sprinkler 110 is not pressurized with water and is at rest. In some embodiments, the surfaces of the bearings 48, 168 are positioned at the centerline 212 of the upper portion 56. In some embodiments, at least a portion of the bearings 48, 168 are positioned above centerline 212 of the upper portion 56. In certain embodiments, the relative position of the bearings 48, 168 can be positioned to allow the deflector assembly 38, 138 to rest on the first contact surface 200 and maintain a distance D1 between the second surface 206 of the wear sleeve 52 and the second contact surface 202 of the upper portion 56. In certain embodiments, the distance D1 can be approximately 1/16". In some cases, the distance D1 can be less than 1/16". In some cases, the distance D1 can be more than 1/16". In some embodiments, when the deflector assembly 38, 138 is at rest with no water flowing through the nozzle 20, a centerline 210 of the wear sleeve 52 is positioned below the centerline 212 of the upper support 56 where each of the centerlines 210 and 212 intersect a centerline 214 of the shaft 50.

Figure 15B:
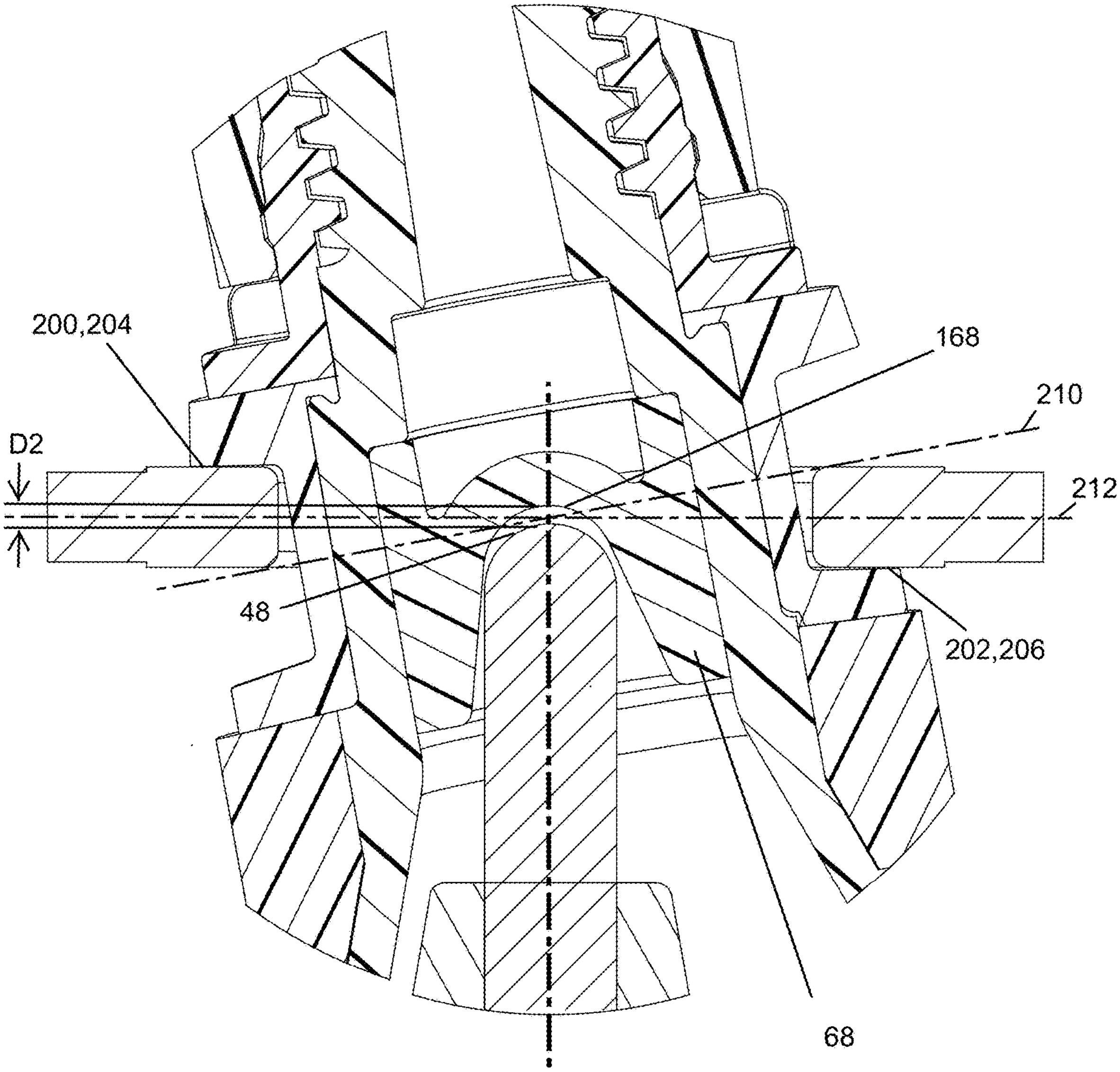
FIG. 15B is an enlarged view similar to FIG. 15A but shows the position of the wear sleeve relative to the upper portion of the housing when the sprinkler is pressurized with water and in operation.

FIG. 15B is an enlarged view similar to FIG. 15A but shows the position of the wear sleeve 52 relative to the upper portion 56 of the housing 40 when the sprinkler 110 is pressurized with water and in operation. In some embodiments, the bearing 168 of the bearing insert 68 is configured to be positioned above the bearing 48 when water is flowing through the sprinkler 110. In some embodiments, the force of the pressurized water from the nozzle 20 impinging on the deflector assembly 38, 138 can force the deflector assembly 38, 138 to move to its maximum limit of angular movement. In some cases, the maximum limit of angular movement can be regulated by the interactions of the wear sleeve 52 and the upper portion 56. In some embodiments, the first surface 204 can be forced in a downward direction to contact the first contact surface 200 causing the second surface 206 to contact the second contact surface 202 when pressurized water flows through the nozzle 20. When the water pressure is initially applied, the surface of the bearing 48 and the surface of the bearing 168 can separate by a distance D2. In some embodiments, the surface of the bearing 48 can be positioned below the centerline 212 of the upper portion 56 while the surface of the bearing 168 is also positioned below the centerline 212. In some embodiments, such as shown in FIG. 15B, the bearing 48 can be positioned below the centerline 212 of the upper portion 56 while at least a portion of the surface of the bearing 168 is positioned above the centerline 212. In some embodiments, the surface of the bearing 48 can be positioned at the centerline 212 of the upper portion 56. In some embodiments, at least a portion of the bearing 48 can be positioned above the centerline 212 of the upper portion 56. In certain embodiments, the relative position of the bearings 48, 168 can be positioned to allow the first and second surfaces 204, 206 of the wear sleeve 52 to contact the first and second contact surfaces 200, 202 of the upper portion 56, respectively, and lift the surface of the bearing 168 a distance D2 from the bearing 48. In certain embodiments, the distance D2 can be approximately 1/32". In some cases, the distance D2 can be less than 1/32". In some cases, the distance D2 can be more than 1/32". In some embodiments, when the deflector assembly 38, 138 is operating with water flowing through the nozzle 20, the centerline 210 of the wear sleeve 52 can be positioned on, or very close to, the same plane as the centerline 212 of the upper support 56 where each of the centerlines 210, 212 intersect the centerline 214 of the shift 50. When the deflector assembly 38, 138 is forced to its maximum limits for movement in some embodiments, the distance D2 between the bearing 48 and the bearing 168 can reduce wear on one or both of the surfaces of the bearings 48, 168. When the deflector assembly 38, 138 is forced to its maximum limits for movement in some embodiments, the distance D2 between the bearing 48 and the bearing 168 can prevent wear on one or both of the surfaces of the bearings 48, 168.

Figure 16:
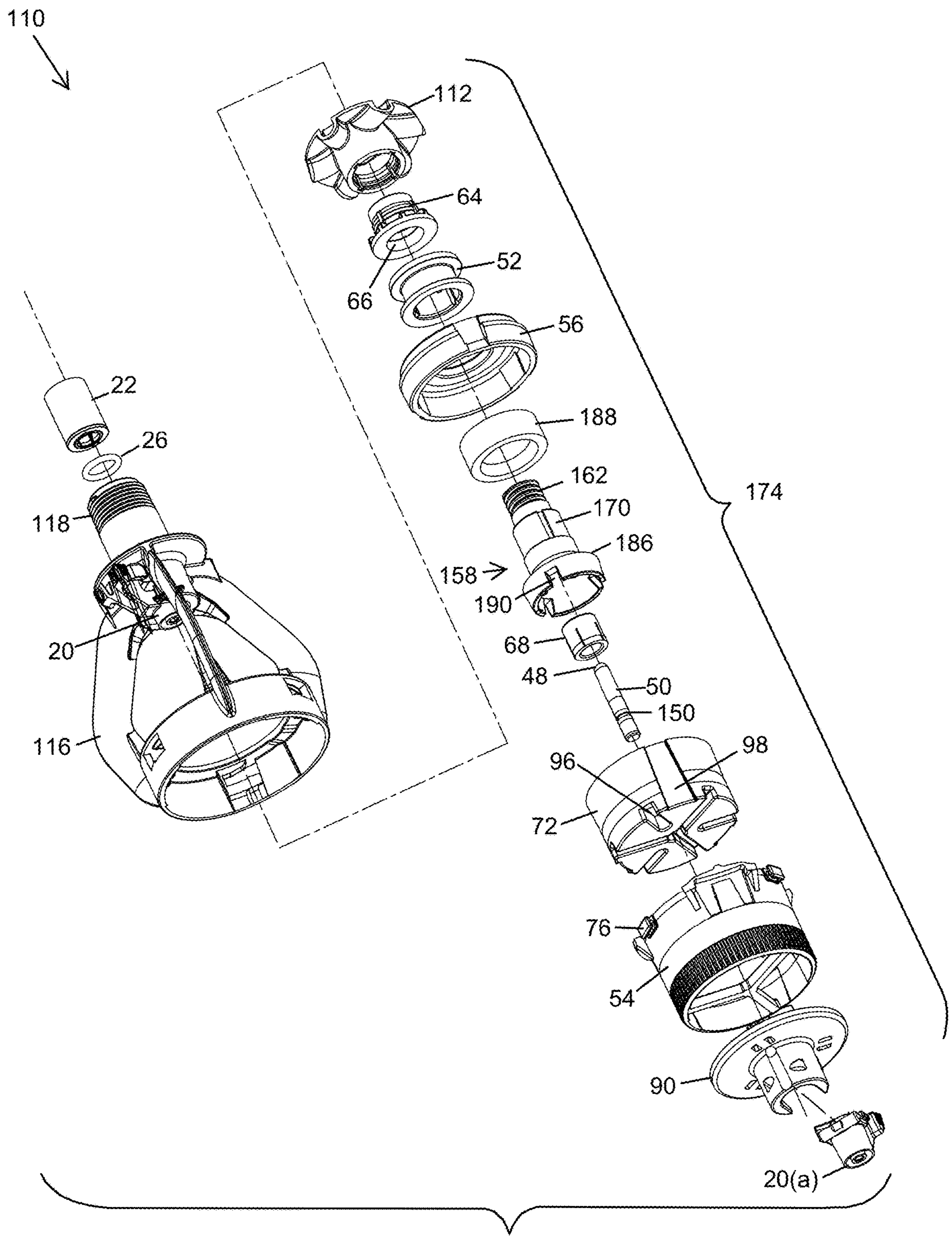
FIG. 16 is a perspective exploded view of the sprinkler of FIG. 12 showing, for example, the one or more notches in the spindle and the one or more weights prior to assembly onto the spindle.

FIG. 16 is a perspective exploded view of the sprinkler 110 of FIG. 12 showing, for example, the one or more notches 190 in the spindle 158 and the one or more weights 188 prior to assembly onto the spindle 158. In some embodiments, the deflector assembly 138, the housing 40, the nozzle carrier 90, and the spare nozzle 20(*a*) together form a subassembly 174. Together in certain embodiments, the subassembly 174 couples to the bracket 116 via the lower portion 54 of the housing 40. In this way, the subassembly 174 including the deflector assembly 138, the housing 40, the nozzle carrier 90, and the spare nozzle 20(*a*) can be removed from the sprinkler 110 by the user simply decoupling the lower portion 54 from the bracket 116.

In some embodiments, the deflector assembly 38, 138 can be fitted with a spindle 58, 158. The deflector assembly 138 illustrated in FIG. 16 is similar to the deflector assembly 38 illustrated in FIG. 6 except, for example, the spindle 158 illustrated in FIG. 16 supports the one or more weights 188. In the illustrated embodiment, the spindle 158 supports one weight 188. In other embodiments, the spindle 158 supports more than one weight 188. Each of the one or more weights 188 can have the same weight or a different weight. In some embodiments, the one or more weights 188 can be constructed of a metal with an appropriate mass. For example, in certain embodiments, the one or more weights 188 are constructed of brass.

In some embodiments, the one or more weights 188 have an annular shape. In some embodiments, the one or more weights 188 are sized to engage with a portion of the spindle 158. For example, in certain embodiments, the one or more weights 188 are pressed onto, or otherwise held securely to the spindle 158. In some embodiments, the number and weight of the one or more weights 188 are selected to adjust or change the rotational speed of the spindle 158. In some embodiments, adding the one or more weights 188 to the spindle 138 reduces the rotational speed of the spindle 158, and subsequently the distributor plate 12 or 112. In this way, water coverage by the sprinkler 110 can be customized.

As is illustrated in the embodiment of FIG. 16, the spindle 158 carries the wear sleeve 52 and the one or more weights 188 about its outer circumference. For example, the wear sleeve 52 and the one or more weights 188 can be installed around a surface 170 formed on the outer circumference of the spindle 158 between an end of the insert 64 and a ridge 186 of the spindle 158. In certain embodiments, the wear sleeve 52 abuts against the insert 64 and the weight 188 so as to maintain a position of the wear sleeve 52 along the outer circumference of the spindle 158 during use of the sprinkler 110. In certain embodiments, the one or more weights 188 abut against the wear sleeve 52 and the ridge 186 so as to maintain a position of the one or more weights 188 along the outer circumference of the spindle 158 during use of the sprinkler 110.

In the illustrated embodiment, the spindle 158 includes an outer thread 162 for engagement with an inner thread 66. In some embodiments, the inner thread 66 is disposed on the distribution plate 112. In the illustrated embodiment, the inner thread 66 is disposed on an insert 64 that is press-fit or otherwise coupled to the distribution plate 112. In some embodiments, the insert 64 can also be removably attached to the distribution plate 112 by using bayonet mounts, snap rings, keys, collars, or other attachment methods (e.g., attachment structures or methods that do not require use of tools or specialized tools for disconnection).

Figure 17:
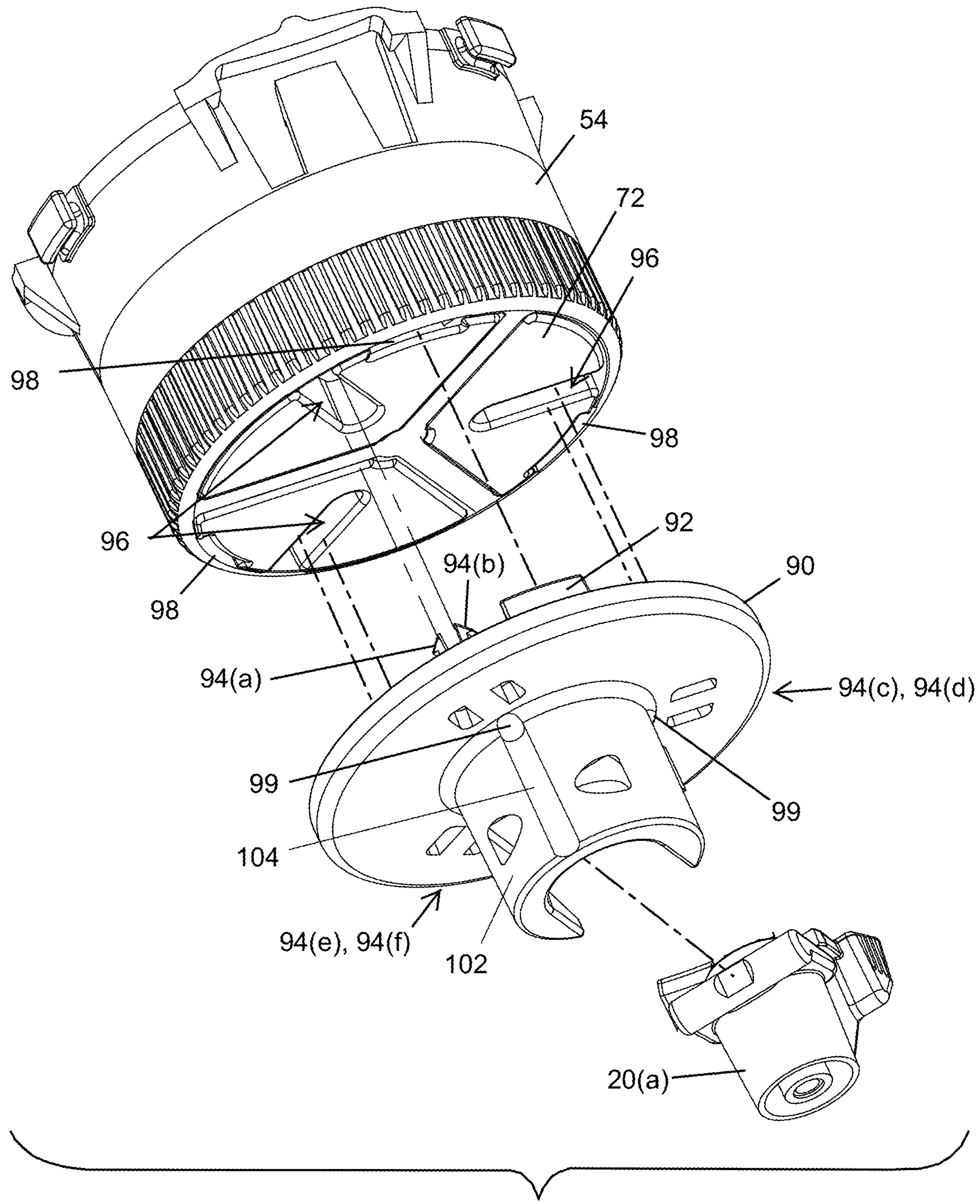
FIG. 17 is an enlarged view of a portion of FIG. 16 that illustrates exemplary structures for engaging the one or more nozzle carriers with the lower portion of the housing.

FIG. 17 is an enlarged view of a portion of FIG. 16 that illustrates exemplary structures for engaging the nozzle carrier 90 with the lower portion 54 of the housing 40. In some embodiments, the nozzle carrier 90 is manufactured as an integral component with the lower portion 54. In other embodiments, the nozzle carrier 90 is separately manufactured and subsequently coupled to the sprinkler 110. For example, in some embodiments, the nozzle carrier 90 comprises one or more hooks 94 (see FIGS. 15 and 17). In some embodiments, the one or more hooks 94 are disposed on an outer surface of the nozzle carrier 90. In some embodiments, the one or more hooks 94 extend in an axial direction away from the spare nozzle 20(*a*). In some embodiments, the one or more hooks 94 are configured to engage with the housing 40. For example, in certain embodiments, the housing 40 comprises one or more slots 96. In certain embodiments, the weight 72 of the housing 40 comprises the one or more slots 96.

The one or more slots 96 can be configured to receive and engage with the one or more hooks 94. The engagement between the one or more hooks 94 and the one or more slots 96 can facilitate securement of the nozzle carrier 90. In the illustrated embodiments, six hooks 94(*a*), 94(*b*), 94(*c*), 94(*d*), 94(*e*), 94(*f*) are formed on the nozzle carrier 90 and engage with three slots 96 of the weight 72. In some embodiments there may be more or fewer hooks 94 and more or less slots 96.

As most clearly shown in FIGS. 15 and 16, the deflector assembly 138 can include the one or more notches 190. In some embodiments, the one or more notches 190 can be formed in the spindle 58, 158. In certain embodiments, the one or more notches 190 are sized and shaped to receive a tool. For example, in certain embodiments, a user engages the tool with the one or more notches 190 to prevent the spindle 58, 158 from rotating relative to the housing 40. While the tool is engaged, the user can grasp and rotate the distribution plate 12, 112 relative to the spindle 58, 158. This can allow the user to unscrew the distributor plate 12, 112 from the spindle 58, 158 and thread a different distributor plate 12, 112 to the spindle 58, 158 without further disassembling the sprinkler 10, 110.

In certain embodiments, the user accesses the one or more notches 190 by inserting the tool through the sprinkler 10, 110. In certain embodiments, the tool is inserted through the housing 40. In certain embodiments, the tool is inserted through the lower portion 54 of the housing 40. For example, in certain embodiments, the tool is inserted through one of the one or more slots 96 in the lower portion 54 of the housing 40 to access the one or more notches 190 in the spindle 58, 158.

In certain embodiments of the sprinkler 10, 110 that include the nozzle carrier 90, the user can remove the nozzle carrier 90 from the housing 40 to access the one or more slots 96. The user then inserts the tool through the one or more slots 96.

In certain other embodiments, the nozzle carrier 90 comprises one or more holes 99 (see FIGS. 13 and 17). In certain embodiments, the one or more holes 99 are positioned on the sprinkler 10, 110 relative to the position of the one or more slots 96. In certain embodiments, at least a portion of a hole of the one or more holes 99 aligns with at least a portion of a slot of the one or more slots 96. In certain embodiments, at least portions of the one or more holes 99 align with portions of the one or more slots 96. In certain embodiments, the one or more holes 99 align with the one or more hooks 94 (see FIGS. 15 and 17). In certain embodiments, the one or more holes 99 align with the one or more slots 96 but are offset from the one or more hooks 94. For example, as illustrated in FIG. 17, the one or more holes 99 can be positioned radially inwardly of the one or more hooks 94 yet still be in alignment with at least a portion of the one or more slots 96.

In some embodiments, the hub 102 of the nozzle carrier 90 axially extends from a surface of the nozzle carrier 90. In some embodiments, at least a portion of the one or more holes 99 can extend along a side of the hub 102. In some embodiments, at least a portion of the one or more holes 99 that extends through the nozzle carrier 90 can form at least a portion of one or more grooves 104 in the side of the hub 102. In this way, the tool is inserted first through the one or more holes 99 in the nozzle carrier 90 and then through the one or more slots 96 to access the one or more notches 190 in the spindle 58, 158. In some embodiments, the radius of the one or more grooves 104 can be greater than the radius of the one or more holes 99. In some embodiments, the radius of the one or more grooves 104 can be less than the radius of the one or more holes 99. In some embodiments, the radius of the one or more grooves 104 can be the same as the radius of the one or more holes 99. In certain embodiments, the one or more grooves 104 can guide the tool towards the one or more holes 99 in the nozzle carrier 90.

In some embodiments, the nozzle carrier 90 comprises one or more nubs 92. In certain embodiments, the one or more nubs 92 are configured to engage with the housing 40. For example, in certain embodiments, the housing 40 comprises one or more apertures 98. In certain embodiments, the weight 72 of the housing 40 comprises the one or more apertures 98. In certain embodiments, the one or more nubs 92 stabilize the nozzle carrier 90 to the housing 40. In some embodiments, the one or more nubs 92 interface with the one or more apertures 98 in the weight 72. In this way in certain embodiments, the one or more hooks 94 secure the nozzle carrier 90 to the weight 72 while the one or more nubs 92 secure the nozzle carrier 90 so as to inhibit excess movement of the nozzle carrier 90 relative to the sprinkler 110.

Terminology

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term “horizontal” as used herein is defined as a plane parallel to the plane or surface of the floor or ground of the area in which the device being described is used or the method being described is performed, regardless of its orientation. The term “floor” floor can be interchanged with the term “ground.” The term “vertical” refers to a direction perpendicular to the horizontal as just defined. Terms such as “above,” “below,” “bottom,” “top,” “side,” “higher,” “lower,” “upper,” “over,” and “under,” are defined with respect to the horizontal plane.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Conjunctive language such as the phrase “at least one of X, Y, and Z,” unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms “approximately,” “about,” “generally,” and “substantially” as used herein represent a value, amount, or characteristic close to the stated value, amount, or characteristic that still performs a desired function or achieves a desired result. For example, the terms “approximately”, “about”, “generally,” and “substantially” may refer to an amount that is within less than 10% of, within less than 5% of, within less than 1% of, within less than 0.1% of, and within less than 0.01% of the stated amount. As another example, in certain embodiments, the terms “generally parallel” and “substantially parallel” refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extends beyond the specifically disclosed embodiments to other alternative embodiments and/or uses of the embodiments and certain modifications and equivalents thereof. For example, some embodiments are configured to operate oriented such that the distribution plate is positioned above the nozzle and the nozzle directs water upward. Accordingly, it is intended that the scope of the sprinkler herein-disclosed should not be limited by the particular disclosed embodiments described above, but should be determined only by a fair reading of the claims that follow.

What is claimed is:

1. A sprinkler assembly comprising:
- an inlet configured to receive water;
- a bracket supported by the inlet;
- a nozzle in fluid communication with the inlet and positioned downstream of the inlet, the nozzle being configured to direct the water out of the nozzle along an axis;
- a deflector assembly positioned downstream of the nozzle, the deflector assembly being configured to move with respect to the axis in one or both of a rotational and a tilting direction, the deflector assembly comprising:
  - a distribution plate positioned downstream of the nozzle and configured to deflect water from the nozzle, and
  - a spindle extending from a side of the distribution plate facing away from the nozzle, the spindle being configured to move with respect to the axis in at least the tilting direction; and
- a housing supported by the bracket and comprising:
  - one or more surfaces configured to contact the spindle so as to limit movement of the deflector assembly in one or both of the rotational and the tilting direction about the housing, and
  - a nozzle carrier and a spare nozzle, the nozzle carrier being positioned below the spindle and configured to releasably secure the spare nozzle to the housing.

2. The sprinkler assembly of claim 1, wherein the nozzle carrier releasably secures to a lower portion of the housing.

3. The sprinkler assembly of claim 2, wherein the lower portion is a weight.

4. The sprinkler assembly of claim 1, wherein the nozzle carrier comprises a hub configured to engage with the spare nozzle.

5. The sprinkler assembly of claim 4, wherein the hub extends axially from the nozzle carrier.

6. The sprinkler assembly of claim 1, wherein the nozzle carrier is an integral component of the housing.

7. The sprinkler assembly of claim 1, wherein the nozzle carrier engages with the housing.

8. The sprinkler assembly of claim 7, wherein the housing comprises one or more slots, and wherein the nozzle carrier comprises one or more hooks configured to engage with the one or more slots.

9. The sprinkler assembly of claim 8, wherein two hooks of the one or more hooks engage with each slot of the one or more slots.

10. A sprinkler assembly comprising:
- an inlet;
- a bracket connected to the inlet;
- a nozzle in fluid communication with the inlet and positioned downstream of the inlet, the nozzle configured to direct water out of the nozzle along a nozzle axis;
- a deflector assembly downstream of the nozzle and configured to move with respect to the nozzle axis in one or both of a rotational and a tilting direction about a pivot point, the deflector assembly comprising:
  - a distribution plate configured to deflect water from the nozzle, and
  - a spindle extending from a side of the distribution plate facing away from the nozzle and terminating at a distal end, the distal end comprising a receptacle, the spindle being configured to move with respect to the nozzle axis in at least the tilting direction;
- a spare nozzle; and
- a housing supported by the bracket and comprising a nozzle carrier, the housing being configured to limit movement of the deflector assembly in at least one or both of the rotational and the tilting direction about the pivot point, the nozzle carrier being positioned below the spindle and configured to releasably secure the spare nozzle.

11. The sprinkler assembly of claim 10, wherein the housing comprises one or more slots, and wherein the nozzle carrier comprises one or more holes, one hole of the one or more holes being sufficiently aligned with one slot of the one or more slots so that a tool can pass through the one hole and the one slot.

12. The sprinkler assembly of claim 11, wherein the spindle further comprises one or more notches disposed about a periphery of the receptacle, the one or more notches being sized and shaped to engage with the tool after the tool passes through the one hole and the one slot.

13. The sprinkler assembly of claim 12, wherein the alignment between the one hole, the one slot, and the one or more notches, allows the tool to prevent rotation of the spindle so that a user can grasp and rotate the distribution plate relative to the spindle.

14. The sprinkler assembly of claim 10, further comprising a bearing supported by the bracket and contacting the receptacle at least when the sprinkler assembly is at rest.

15. The sprinkler assembly of claim 10, wherein the nozzle carrier is an integral component of the housing.

16. The sprinkler assembly of claim 10, wherein the nozzle carrier engages with the housing.

17. A sprinkler assembly comprising:
- an inlet;
- a bracket connected to the inlet;
- a nozzle in fluid communication with the inlet and positioned downstream of the inlet, the nozzle configured to direct water out of the nozzle along a nozzle axis;
- a distribution plate downstream of the nozzle and configured to move with respect to the nozzle axis in one or both of a rotational and a tilting direction about a pivot point;
- a spindle extending from a side of the distribution plate facing away from the nozzle, the spindle being configured to move with respect to the nozzle axis in at least the tilting direction;
- a spare nozzle; and
- a housing supported by the bracket and comprising a nozzle carrier, the housing being configured to limit movement of the distribution plate in at least one or both of the rotational and the tilting direction about the pivot point, the nozzle carrier being positioned below the spindle and configured to releasably secure the spare nozzle.

18. The sprinkler assembly of claim 17, wherein the distribution plate comprises a plurality of curved grooves on a side of the distribution plate facing the nozzle, the plurality of curved grooves configured to deflect water from the nozzle.

19. The sprinkler assembly of claim 17, wherein the nozzle carrier comprises a hub configured to engage with the spare nozzle.

20. The sprinkler assembly of claim 17, wherein the nozzle carrier couples to a lower portion of the housing.

21. A sprinkler assembly comprising:

an inlet;

a bracket connected to the inlet;

a nozzle in fluid communication with the inlet and positioned downstream of the inlet, the nozzle configured to direct water out of the nozzle along a nozzle axis;

a deflector assembly downstream of the nozzle and configured to move with respect to the nozzle axis in one or both of a rotational and a tilting direction about a pivot point, the deflector assembly comprising:

a distribution plate configured to deflect water from the nozzle, and a spindle extending from a side of the distribution plate facing away from the nozzle and terminating at a distal end, the distal end comprising a receptacle; and a housing supported by the bracket and comprising a nozzle carrier, the housing being configured to limit movement of the deflector assembly in at least one or both of the rotational and the tilting direction about the pivot point, the nozzle carrier being configured to releasably secure a spare nozzle, wherein the housing comprises one or more slots, and wherein the nozzle carrier comprises one or more holes, one hole of the one or more holes being sufficiently aligned with one slot of the one or more slots so that a tool can pass through the one hole and the one slot, and wherein the spindle further comprises one or more notches disposed about a periphery of the receptacle, the one or more notches being sized and shaped to engage with the tool after the tool passes through the one hole and the one slot.

* * * * *